US00RE43358E

(19) United States
(12) Reissued Patent
Fujikawa et al.

(10) Patent Number: US RE43,358 E
(45) Date of Reissued Patent: May 8, 2012

(54) DATA READING APPARATUS

(75) Inventors: Masashi Fujikawa, Hara-mura (JP); Toshiyuki Sasaki, Yamagata-mura (JP); Kunio Omura, Shiojiri (JP); Norio Nagata, Matsumoto (JP)

(73) Assignee: Seiko Epson Corporation, Tokyo (JP)

(21) Appl. No.: 13/004,221

(22) Filed: Jan. 11, 2011

Related U.S. Patent Documents

Reissue of:
(64) Patent No.: 7,477,427
Issued: Jan. 13, 2009
Appl. No.: 10/759,868
Filed: Jan. 15, 2004

(30) Foreign Application Priority Data

Jan. 21, 2003 (JP) ..... 2003-012349
Mar. 12, 2003 (JP) ..... 2003-066747
Nov. 17, 2003 (JP) ..... 2003-386781

(51) Int. Cl.
*H04N 1/04* (2006.01)

(52) U.S. Cl. ..... 358/474; 358/498; 358/497; 271/264; 271/314; 355/321; 235/454; 399/405; 399/311

(58) Field of Classification Search ..... 358/474, 358/498, 497, 496, 501; 271/264, 314, 273, 271/3.19, 225; 355/311, 321, 75; 400/607.1, 400/605, 610, 586; 235/454, 379, 380, 449, 235/440
See application file for complete search history.

(56) References Cited

U.S. PATENT DOCUMENTS 4,065,662 A * 12/1977 Garczynski et al. ..... 235/419
5,298,937 A * 3/1994 Telle ..... 355/23
5,463,451 A * 10/1995 Acquaviva et al. ..... 399/211
5,482,264 A 1/1996 Atsumi et al.
5,532,839 A * 7/1996 Beikirch et al. ..... 358/401
5,563,699 A 10/1996 Tsukamoto
5,760,919 A * 6/1998 Acquaviva et al. ..... 358/450
5,839,044 A 11/1998 Taruki
6,068,187 A 5/2000 Momose
6,103,985 A 8/2000 Shell et al.
(Continued)

FOREIGN PATENT DOCUMENTS

EP 0 492 900 A2 12/1991
(Continued)

OTHER PUBLICATIONS http://www.digitalcheck.com/11_products.html—Digital Check Manufacturers of digital check scanners for the financial industry around the world. p. 1 or 1, dated Nov. 21, 2003.

(Continued)

*Primary Examiner* — Negussie Worku

(57) ABSTRACT

A data reading apparatus for reading and/or scanning data from a first and second scanned medium comprising a first transportation path P1, along which the first scanned medium is conveyed and a second transportation path P2, along which the second scanned medium is conveyed and wherein the first and second transportation paths each have a common mutually shared middle transportation path through which both scanned media must pass and a common data reader reading data from each scanned medium respectively. Checks S are conveyed on the first transportation path P1, cards C are conveyed on the second transportation path P2 at a different transportation height from that of the first transportation path P1 with data read from the respective media as they are being conveyed. Because the transportation heights differ, scanned media can be transported on different transportation paths without involving special switching devices.

15 Claims, 15 Drawing Sheets

U.S. PATENT DOCUMENTS

| | | | | |
|---|---|---|---|---|
| 6,257,783 | B1 * | 7/2001 | Hanaoka et al. | 400/578 |
| 6,290,129 | B2 * | 9/2001 | Momose | 235/449 |
| 6,350,005 | B1 | 2/2002 | Asai et al. | |
| 6,438,350 | B1 * | 8/2002 | Hasegawa et al. | 399/374 |
| 6,504,623 | B1 * | 1/2003 | Ito | 358/1.18 |
| 6,651,885 | B1 * | 11/2003 | Arias | 235/381 |
| 6,832,723 | B2 * | 12/2004 | Murata et al. | 235/439 |
| 6,953,191 | B2 | 10/2005 | Landwehr et al. | |
| 7,010,155 | B2 * | 3/2006 | Koakutsu et al. | 382/137 |
| 7,056,047 | B2 * | 6/2006 | Sasaki et al. | 400/607.2 |
| 7,124,935 | B2 * | 10/2006 | Osawa et al. | 235/379 |
| 7,210,630 | B2 | 5/2007 | Nagata et | |
| 7,231,171 | B2 | 6/2007 | Shibata et al. | |
| 7,414,762 | B2 * | 8/2008 | Poletto | 358/496 |
| 7,617,985 | B2 * | 11/2009 | van Os | 235/475 |
| 7,881,652 | B2 * | 2/2011 | Edwards et al. | 399/364 |
| 2002/0169509 | A1 * | 11/2002 | Huang et al. | 700/66 |
| 2003/0076552 | A1 * | 4/2003 | Lo et al. | 358/482 |
| 2004/0265032 | A1 | 12/2004 | Furihata et al. | |
| 2005/0127160 | A1 | 6/2005 | Fujikawa | |
| 2005/0128282 | A1 | 6/2005 | Yamagata | |
| 2007/0076271 | A1 * | 4/2007 | Shirai | 358/498 |
| 2009/0103147 | A1 * | 4/2009 | Murakami | 358/498 |
| 2009/0168127 | A1 * | 7/2009 | Hamada et al. | 358/498 |

FOREIGN PATENT DOCUMENTS

| | | | |
|---|---|---|---|
| EP | 0 492 900 | A2 | 7/1992 |
| JP | 2000-302283 | | 10/2000 |
| JP | 2000-344428 | | 12/2000 |
| JP | 2001-274930 | | 10/2001 |
| JP | 2003-006713 | | 1/2003 |

OTHER PUBLICATIONS

Cover letter from Singapore Patent Office with attached communication from Austrian Patent Office including a Search Report and a copy of each of the three relevant references cited therein, 2005.

* cited by examiner (a)

(b)

DATA READING APPARATUS

Matter enclosed in heavy brackets [ ] appears in the original patent but forms no part of this reissue specification; matter printed in italics indicates the additions made by reissue.

BACKGROUND OF THE INVENTION

1. Field of Technology

The present invention relates to a data reading apparatus for reading data from at least a first and second scanned medium conveyed over a plurality of transportation paths, and relates more particularly to a data reading apparatus capable of handling scanned media that bend easily, such as paper, and scanned media that do not bend easily, such as drivers licenses and credit cards.

2. Description of Related Art

Payment systems using checks are common particularly in Europe and North America. Payments and transfers of many kinds are accomplished by accepting checks, and these checks are typically brought to a bank for depositing the funds or cashing the check.

Bank tellers in every bank branch must therefore often process numerous checks in a short time. The main tasks performed at the teller window involve a bank clerk verifying the check, confirming the date, and verifying the signature, and then depositing the funds or cashing the check. The received check is also endorsed and a receipt is issued as needed.

To verify the person presenting the check, identification such as a drivers license or ID card must be presented, and in some cases it may be necessary to copy the drivers license or ID card on a photocopier and file the copy.

Some banks have started trying to electromagnetically read checks brought to the bank, and efforts to improve check processing efficiency in the future by connecting bank branches and different banks on-line are underway.

As part of these efforts electromagnetically reading checks at the teller window is already being tried, and small check processing devices that can be installed at the teller window have been proposed.

This check processing device has a check transportation mechanism, and a magnetic ink character reader (MICR), scanner, and printer disposed along the check transportation path. When the bank teller receiving a check from a customer passes the check through this check processing device, the check processing device reads the check using the MICR and scanner, and then endorses the check using the printer.

Efforts to use the scanner to capture and digitize data from a drivers license, ID card, or other identification presented to verify the check bearer, and to use this data for on-line processing in order to prevent the improper use of checks, have also started.

See, for example, Japanese Examined Pat. Appl. Pub. No. 2000-344428.

This processing device typically has a transportation path with a U-shaped configuration. This is so that the inserted check makes a U-turn through the transportation path of the processing device and is ejected near the insertion entrance. This mechanism enables the bank teller to easily insert the check into the processing device and to then to remove the check while remaining seated.

Data on the check is also read by the MICR, scanner, or other detection device disposed along the U-shaped part of the transportation path, and the check endorsement is then printed.

The drivers license, ID card, or other identification presented for verification cannot be easily bent and therefore cannot be passed through the U-shaped part of the transportation path to be scanned. Another image scanner must therefore be provided if an image of the drivers license or ID card is to be captured.

It is, however, difficult to place another new device in the limited space available at a bank teller window. Furthermore, if the scanner is located in a different place, the teller must leave the window in order to scan the identification, and this lowers productivity.

An object of the present invention is therefore to solve the conventional problem described above and provide a compact data reading apparatus that can be easily installed where there is limited space, such as at a bank teller window, and can in a single device execute a process to electronically read data from checks and other media that can be bent, and a process to electronically read data from drivers licenses and other media that cannot be bent.

SUMMARY OF THE INVENTION

The data reading apparatus of the present invention is a solution to the problem described above and broadly includes a first transportation path with a U-shape for transporting a first scanned medium such as a check; a second transportation path having a linear shape sharing a part of the transportation path with the first transportation path for conveying a second scanned medium such as a drivers license; a common middle transportation path through which both the first scanned medium and the second scanned medium passes and a data reader located along said middle transportation path for reading data from said first scanned media and/or said second scanned media in sequence. By conveying first scanned media and second scanned media at different transportation elevations, a single compact device can convey and read data from different scanned media.

More specifically, the data reading apparatus comprises:

first transportation rollers for conveying a first scanned medium along a first transportation path;

second transportation rollers for conveying a second scanned medium along a second transportation path; and a data reader for reading data from either the first scanned medium or the second scanned medium;

wherein the first transportation path and second transportation path have a mutually shared middle transportation path, and the data reader for reading data from the first and second scanned medium is disposed along the middle transportation path.

The first transportation path in the data reading apparatus may further comprise:

a first straight transportation path;

a first curved transportation path connected between the first straight transportation path and the mutually shared middle transportation path for changing the transportation direction of the first scanned medium 90 degrees as seen from the first straight transportation path;

a second curved transportation path connected to the mutually shared middle transportation path for changing the transportation direction of the first scanned medium 90 degrees as seen from the middle transportation path; and a second straight transportation path connected to the second curved transportation path.

The second transportation path in the data reading apparatus may further comprise:

an insertion opening for inserting the second scanned medium into the mutually shared middle transportation path; and a reversing transportation path connected to the mutually shared middle transportation path for reversing the transportation of the second scanned medium.

The second transportation path may also include an adjustable reference bottom for changing the level of the bottom of the second transportation path relative to the level of the first transportation path reference bottom.

The data reading apparatus second curved transportation path may further comprise a guide for guiding the transportation direction of the first scanned medium to change 90 degrees, with said guide being disposed lower than the reference bottom of the second transportation path.

The data reading apparatus may further comprise an upper pressure member disposed above the reference bottom of the second transportation path for pressing the first scanned medium or second scanned medium to the data reader; and a lower pressure member disposed below the reference bottom of the second transportation path for pressing the first scanned medium to the data reader.

The lower pressure member may be a dropping prevention member for preventing the second scanned medium from dropping below the reference bottom of the second transportation path.

The data reading apparatus may further comprise an upper pressure roller disposed above the reference bottom of the second transportation path for transporting the first scanned medium or second scanned medium; and a lower pressure roller disposed below the reference bottom of the second transportation path for transporting the first scanned medium.

In addition, the data reading apparatus may further comprise a print head disposed along the first transportation path for printing to the first scanned medium.

The data reader in the data reading apparatus may comprise an image scanning sensor for capturing an image of the first scanned medium or second scanned medium.

The image scanning sensor may be a magnetic sensor for reading magnetic data on the first scanned medium or second scanned medium.

In the data reading apparatus of the present invention the first scanned medium is preferably composed of a bendable material, while the second scanned medium is preferably composed of a material that is difficult to bend.

The data reading apparatus further comprises a medium detector disposed to the second transportation path for detecting a leading edge and trailing edge of the second scanned medium;

wherein transportation of the second scanned medium is controlled according to a detection signal from the medium detector.

By providing a common middle transportation path for both the first scanned media and the second scanned media, a data reading apparatus according to the present invention does not need to use a separate data reader for each scanned media, and data can be captured from both the first scanned media and the second scanned media using a data reading apparatus having only one data reader. The number of data readers in the data reading apparatus can therefore be reduced to a single data reader and, the relative area occupied by the transportation path can be reduced permitting the data reading apparatus to be compact and small in size.

Furthermore, the first transportation path in the data reading apparatus of the present invention combines a first straight transportation path, first curved transportation path, a middle transportation path, a second curved transportation path, and a second straight transportation path. A first scanned medium is transported through the first transportation path, whereupon it changes direction 180 degrees, for example, by changing direction 90 degrees twice while traveling through the first transportation path before being ejected therefrom upon exiting the second straight transportation path. That is, the data reading apparatus according to the present invention has a curved transportation path, which is substantially U-shaped and has an inlet side to receive a first scanned medium and an outlet side. An operator using the data reading apparatus can, while remaining seated, insert the first scanned medium into the data reading apparatus for reading data therefrom and with the first scanned medium being ejected from an exit close to the operator.

It should be noted that the data reading apparatus of this invention shall not be limited to a transportation path of substantially U-shaped geometry, and that any curvature could be used, including, for example, a J-shaped or C-shaped curve, or the curve of a polynomial function such as an S-curve.

In the second transportation path the second scanned medium inserted from the insertion opening is transported through the middle transportation path to the reversing transportation path, whereupon its direction is reversed, passed back through the middle transportation path, and discharged from the insertion opening. The first transportation path and second transportation path can thus be aligned at the middle transportation path by this configuration, and a compact data reading apparatus can be provided.

Furthermore, because the reference bottom of the second transportation path in the data reading apparatus of this invention is set above the reference bottom of the first transportation path, the first scanned medium and second scanned medium can be conveyed along the same middle transportation path at separate heights. The data reading apparatus of the present invention can consistently transport a first scanned medium and second scanned medium separately along respective transportation paths without using a special switching mechanism for changing the transportation path, and without such problems occurring when the first scanned medium traveling on the first transportation path switches onto the second transportation path, or the second scanned medium traveling on the second transportation path is switched onto the first transportation path.

The second transportation path in the data reading apparatus according to the present invention further includes a guide for guiding a change in transportation direction of the first scanned medium of 90 degrees with the guide located below the reference bottom of the second transportation path. Therefore, a first scanned medium traveling the first transportation path is guided by this guide into the second straight transportation path, but a second scanned medium traveling along the second transportation path will not be guided by this guide. Therefore, the second scanned medium will not be accidentally guided into the first transportation path, and will be consistently transported through the second transportation path.

Moreover, in accordance with the present invention, the pressure members and pressure rollers are disposed on the upper and lower sides of the middle transportation path of the data reading apparatus and are set so that the scanned media can be pressed with appropriate force against the medium by adjusting the pressure produced by each pressure member. Furthermore, because the transportation height of the first scanned medium and second scanned medium differ, problems, such as described below, can occur if this entire area is covered with a single roller. For example, when transporting the second scanned medium, if the medium is held only at the top part of the roller, the roller will only partially contact the medium, and the medium may not be transported normally. By using separate pressure rollers at the height of the top of the middle transportation path and at a lower height therebelow one-sided contact is prevented enabling the media to be transported normally.

Furthermore, the lower pressure member is configured to prevent the second scanned medium from dropping below the reference bottom of the second transportation path. Therefore, the second scanned medium can be prevented from being fed to the bottom of the middle transportation path where the first scanned medium is scanned even when, for example, the second scanned medium is inserted from the insertion opening at a downward angle. It can therefore be configured so that second scanned media can be transported consistently along the reference bottom of the second transportation path.

The data reading apparatus of the present invention also employs a print head disposed to the first transportation path, and can therefore appropriately print to the first scanned medium as needed.

Data readers used with a data reading apparatus according to the present invention may include image scanning sensors and magnetic sensors so that images can be captured from the first scanned medium or second scanned medium, or magnetic data can be read from the first scanned medium or second scanned medium, according to the application.

The first scanned medium of the data reading apparatus according to the present invention is a bendable medium such as a paper check, and the second scanned medium is a hard-to-bend medium such as a drivers license or an identification card.

In the data reading apparatus according of the present invention the second transportation path preferably has a medium detector disposed thereto for detecting the leading edge and trailing edge of the second scanned medium, and controls the transportation of the second scanned medium in response to a detection signal.

The data reading apparatus according to the present invention may, for example, be installed at a teller window so that checks may be passed through the first transportation path to capture an image of the check and to print an endorsement. A drivers license or ID card, for example, needed to verify the person may likewise be transported through the second transportation path to capture an image. The entire operation can therefore be processed easily while the teller remains seated, thereby improving productivity.

The data reading apparatus is not limited to bank operations, and can for example, be used in supermarkets for processing both checks and credit cards if an MICR device is included as the data reader.

The data reading apparatus of the present invention does not require the transportation height of the first scanned medium or the second scanned medium to be above or below one another and, either medium could be transported on the upper or lower transportation paths.

ADVANTAGES OF THE INVENTION

The data reading apparatus of the present invention is a single device which can electronically read data from and print data to a check, and can electronically read data from a drivers license presented for user verification, in sequence at a single location.

More particularly, by changing the heightwise position of the first transportation path and second transportation path, different types of scanned media can be transported on different transportation paths without the necessity of a complicated apparatus such as a transportation path switching mechanism. The device of the present invention is extremely compact and can be installed in limited space at a teller window so that a bank teller can complete all checking processing operations while remaining seated. Job productivity can therefore be significantly improved compared with the prior art.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the data reading apparatus according to the present invention is hereafter described with reference to the accompanying figures.

Figure 1:
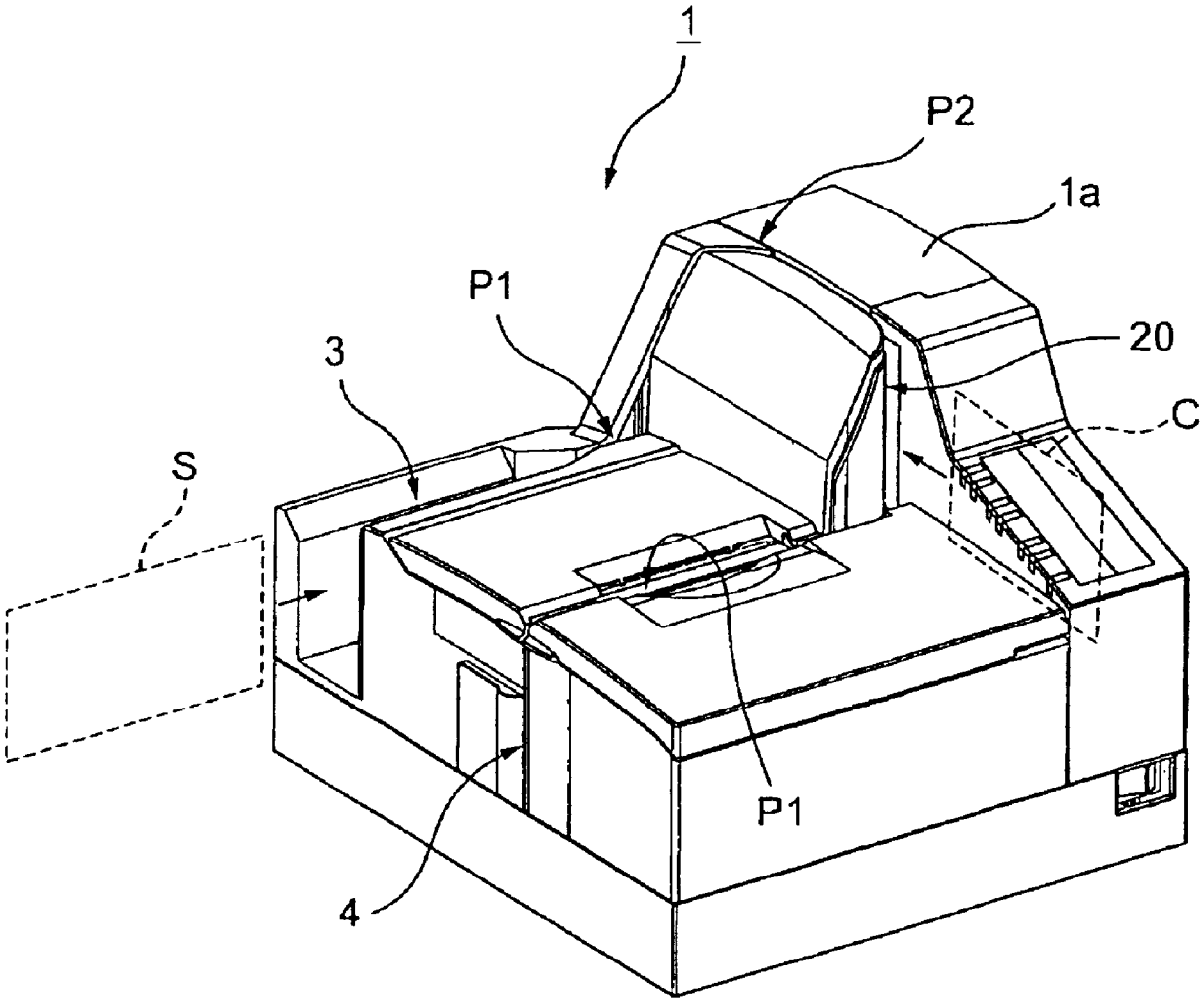
FIG. 1 is an oblique external view of a data reading apparatus according to the present invention.

FIG. 1 shows a data reading apparatus 1 according to a preferred embodiment of the invention.

As shown in FIG. 1, this embodiment of the data reading apparatus 1 is configured so that it can transport a first medium, preferably a paper check S. The check S is loaded into paper supply part 3 along a paper transportation path P1 formed in the case 1a. A card C, representing the second scanned medium may thereafter be inserted from a card insertion opening 20 along a transportation path P2, which is also formed in the case 1a. More specifically, this data reading apparatus 1 is both a check processing device and a card processing device. As a check processing device, it captures an image of the check S, reads magnetic characters printed on the check S, and prints on the check S while transporting the check S through a first transportation path P1. As a card processing device, it captures an image of the card C while transporting the card C along a second transportation path P2. That is, the data reading apparatus 1 according to this embodiment of the invention functions as both a check S and card C image reader and includes an MICR device for reading the check S, and a printer for printing on the check S.

Figure 2:
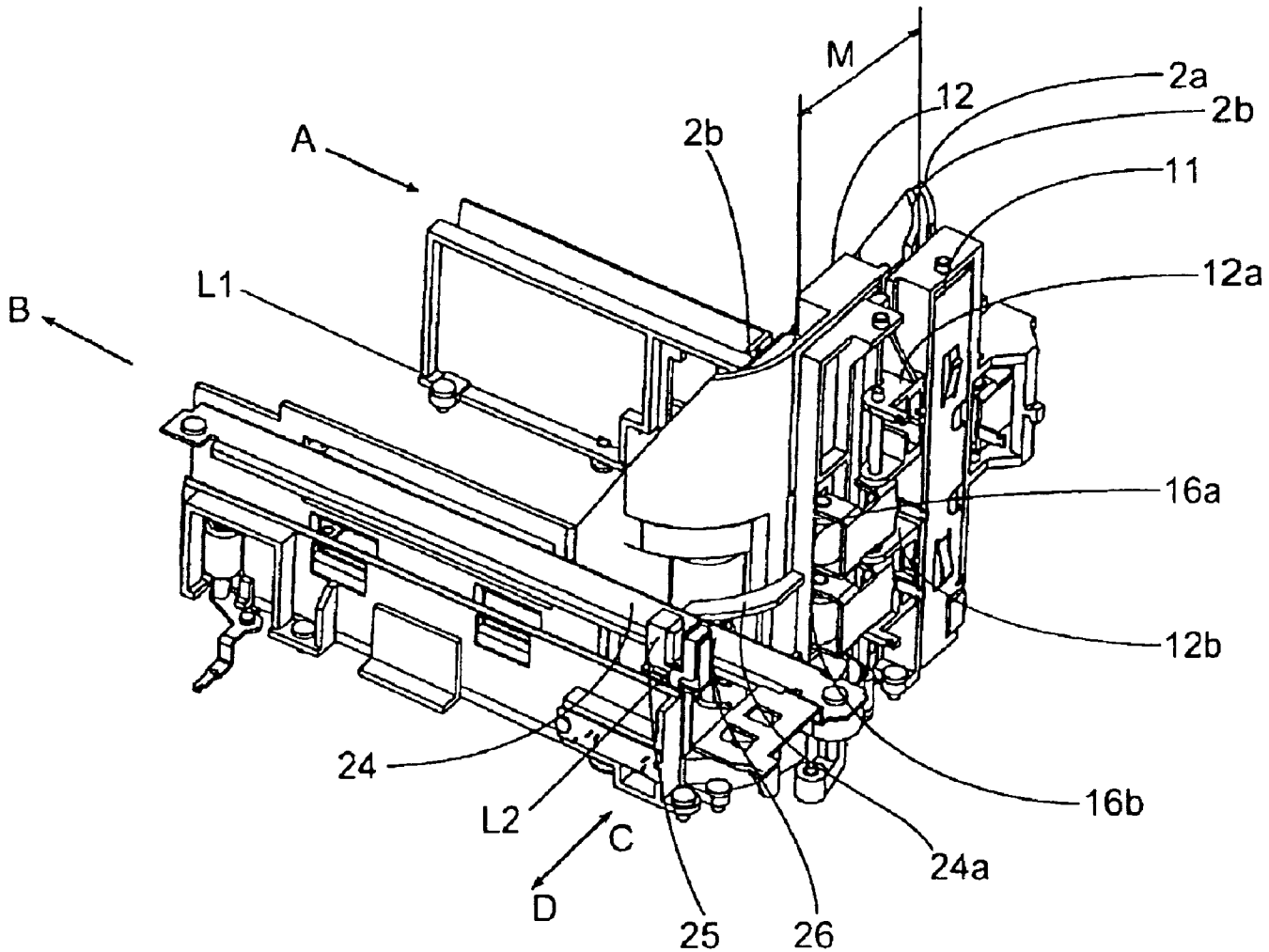
FIG. 2 is a schematic overview of a data reading apparatus having plural transportation paths according to a preferred embodiment of the invention (as seen from the second scanned medium insertion side)
Figure 3:
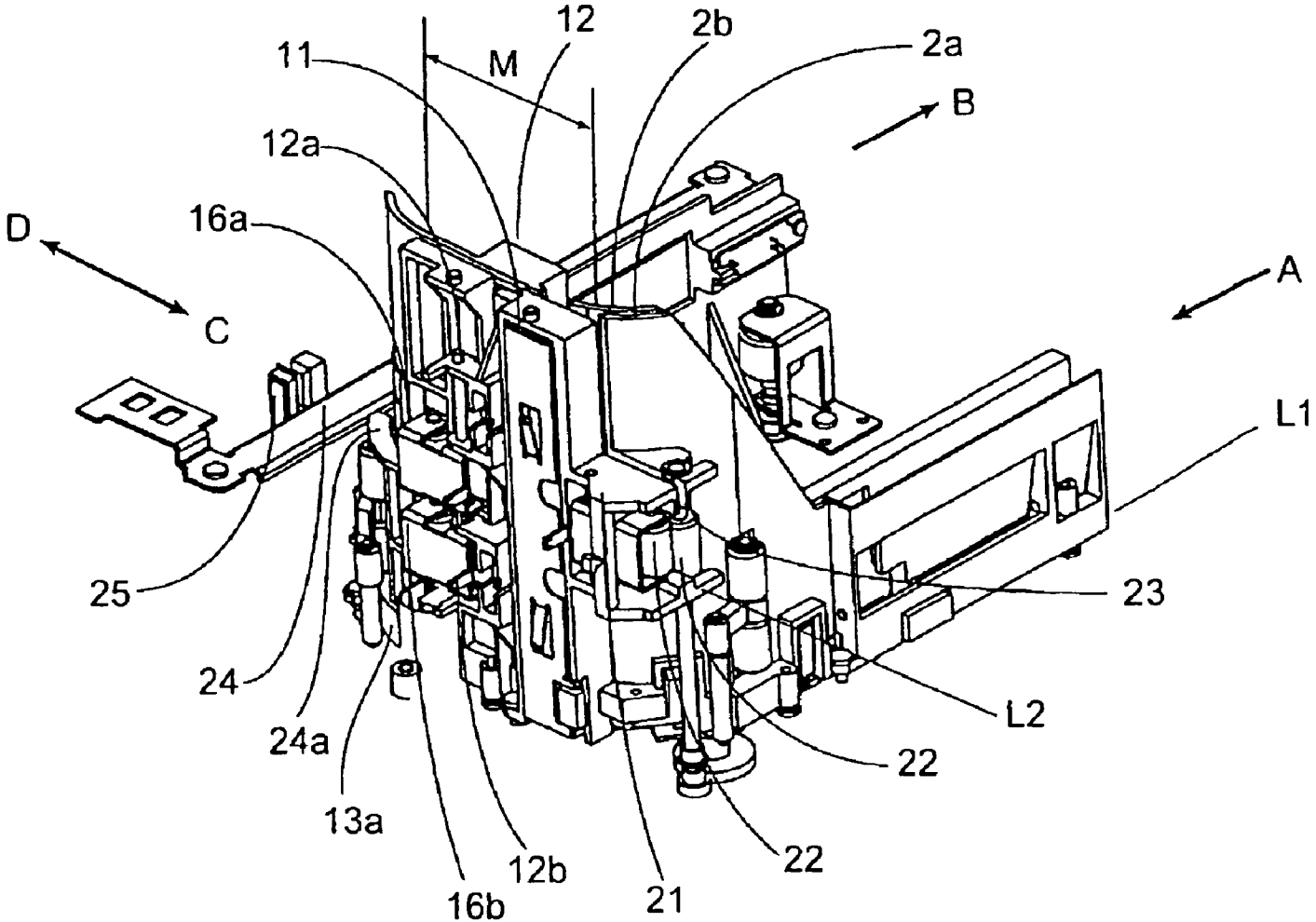
FIG. 3 is a schematic overview of a data reading apparatus having plural transportation paths according to a preferred embodiment of the invention (as seen from the second scanned medium reversing side)
Figure 4:
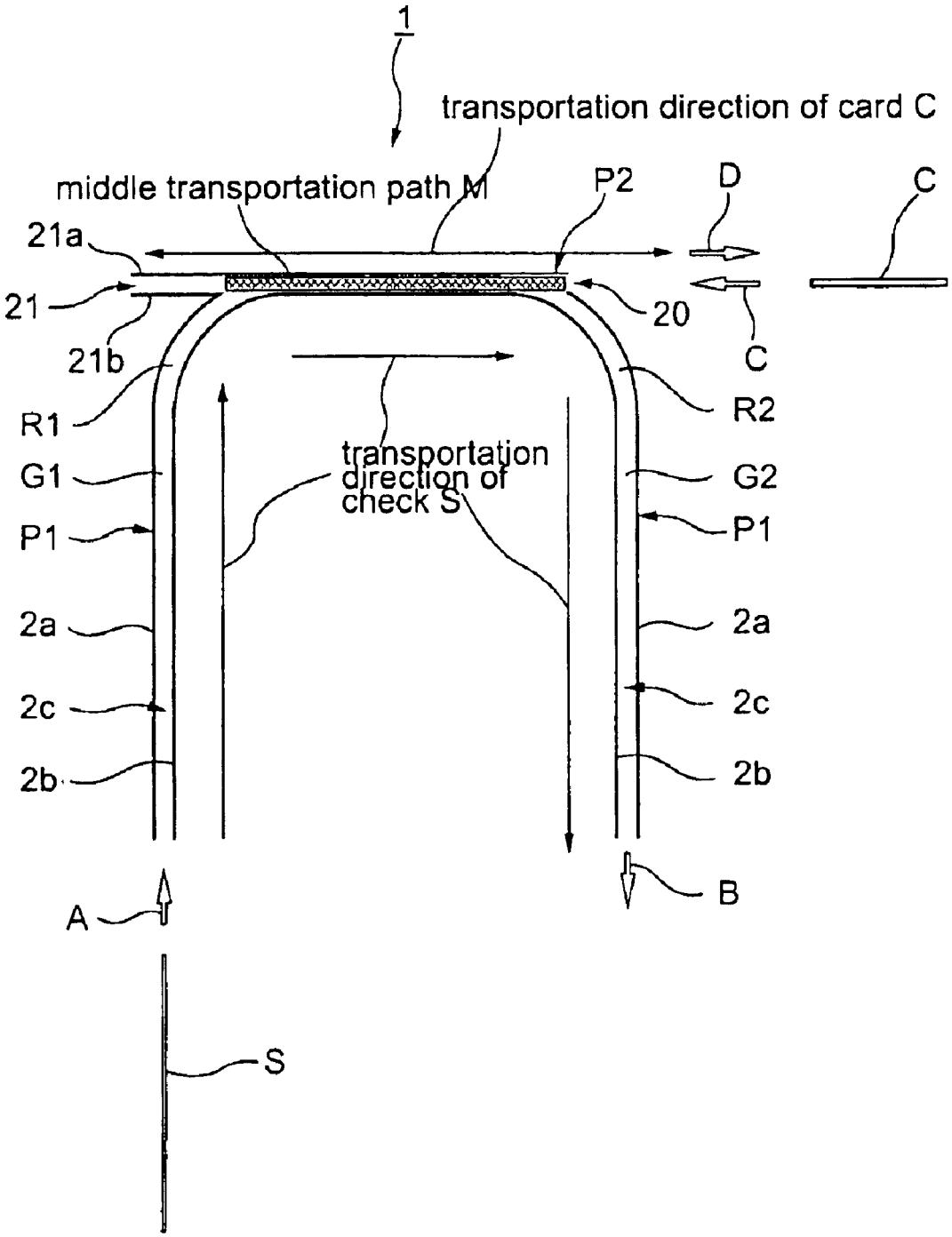
FIG. 4 shows the first transportation path, second transportation path, and middle transportation path.
Figure 5:
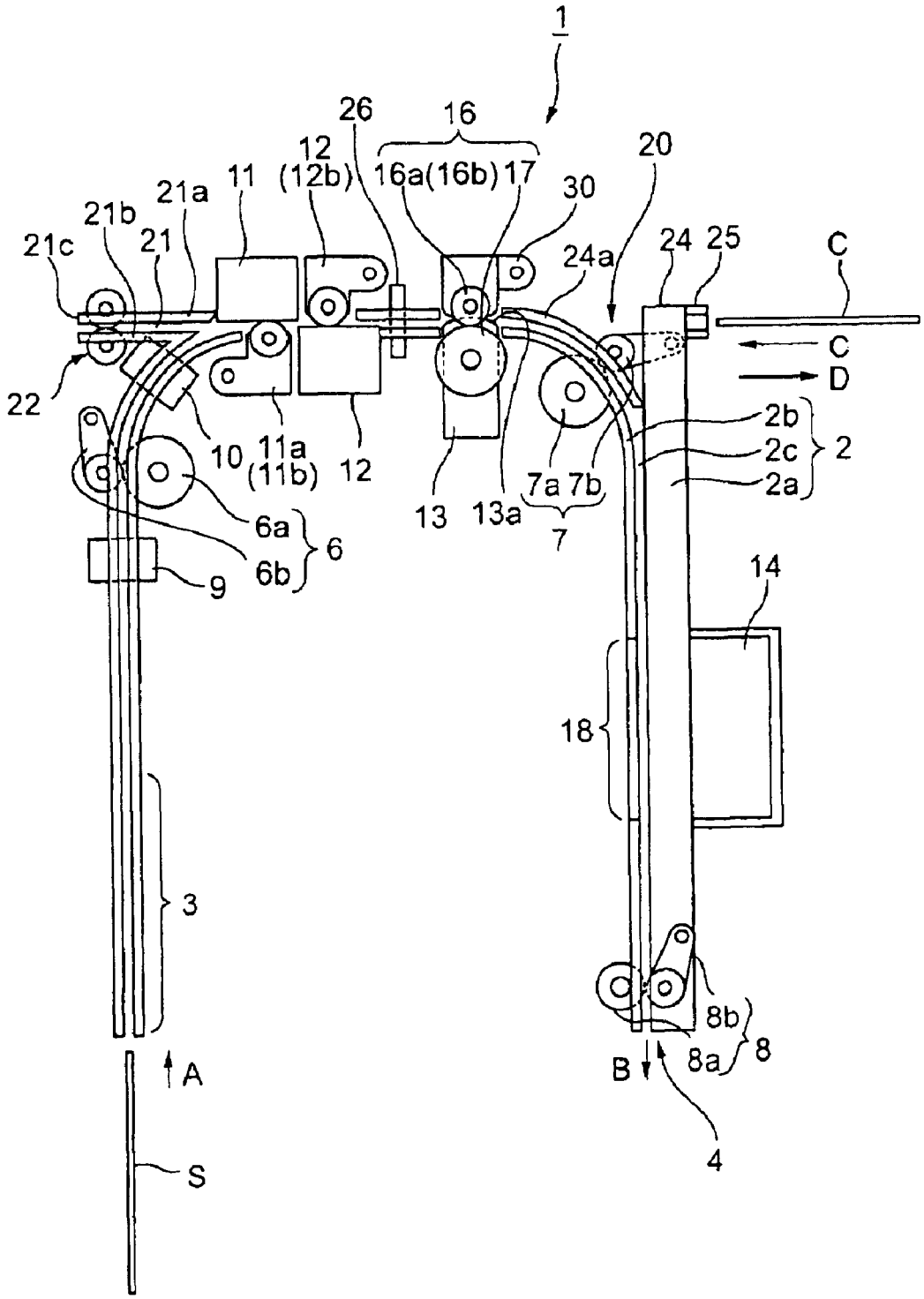
FIG. 5 is a plan view showing in detail a data reading apparatus having multiple transportation paths according to the present invention.

FIG. 2 and FIG. 3 are oblique views showing the data reading apparatus 1 of this embodiment with the case 1a removed, FIG. 4 is a schematic drawing showing the first transportation path P1 and the second transportation path P2. FIG. 5 is a plan view showing the transportation mechanism and reading devices disposed along the first transportation path P1 and second transportation path P2.

As shown in FIG. 2 and FIG. 3 and more particularly in FIG. 4, the first transportation path P1 is a transportation path on which checks S and other slip forms (first scanned medium) made of a pliable material are transported. This first transportation path P1 is composed of a first path section G1, a first curved section R1 a middle path section M, a second curved section R2 and a second path section G2. The first and second sections should preferably be straight sections aligned in parallel with one another. The middle path section M may likewise be a straight section but should be oriented transverse to the straight sections G1 and G2. This middle path should correspond to the bottom of the U-shaped configuration formed by the first transportation path P1. The curved sections R1 and R2 connect the first path section G1 and the second path section G2 to the middle path M on opposite sides thereof for changing the path direction 90 degrees from the direction of the first path section G1 to the middle path section M and again 90 degrees from the middle path section M to the discharge path section G2 so that the checks are discharged parallel to the path of insertion but in opposite directions.

The second transportation path P2 is a transportation path with a substantially linear configuration for transporting cards C (second scanned medium) such as business cards, which are thicker and made of hard-to-bend materials, such as drivers licenses and ID cards. The first transportation path P1 and second transportation path P2 share the middle transportation path M, which corresponds to the bottom of the U shaped configuration of the first transportation path. Data reading devices are disposed along the middle transportation path M of this data reading apparatus 1.

The data reading apparatus 1 is described below for transporting a check S, representing the first scanned medium, and a card C representing the second scanned medium.

As shown in FIG. 4, the configuration of the first transportation path P1 has an outside guide 2a and an inside guide 2b, so that the check S is conveyed along a transportation part 2c, representing the space between this outside guide 2a and the inside guide 2b. A check S is inserted into the first transportation path P1 from a paper supply part 3 in the direction of the arrow A as shown in FIG. 4 and in FIG. 5 respectively. The paper supply part 3 is configured so that a plurality of checks S can be loaded, with each checks fed one at a time into the first transportation path P1.

First transportation rollers 6 on the upstream side of middle transportation path M, middle transportation rollers 16 in the middle transportation path M, and second transportation rollers 7 on the downstream side of the middle transportation path M, function to control movement of each check S along the first transportation path P1 from the insertion path G1 to the discharge path G2 for transporting the checks S through the apparatus.

The first transportation rollers 6 include a drive roller 6a and a pressure roller 6b with the pressure roller 6b being disposed opposite the drive roller 6a and with the first transportation path P1 located between the drive and pressure rollers. The second transportation rollers 7 include a drive roller 7a and a pressure roller 7b with the pressure roller 7b being disposed opposite the drive roller 7a and with the first transportation path P1 located therebetween. Note that the second transportation rollers 7 have basically the same construction as the first transportation rollers 6, but that pressure roller 7b is disposed so that the position of the roller height is always below the middle transportation path M so as to not interfere with a card C transported straight over the top of the middle transportation path M.

As shown in FIG. 5, the middle transportation rollers 16 include a lower pressure roller 16b disposed below the first transportation path P1, an upper pressure roller 16a disposed above the lower pressure roller 16b, and a drive roller 17 disposed opposite the upper pressure roller 16a and lower pressure roller 16b with the middle transportation path M therebetween.

As shown in FIG. 5, a check S delivered into the first transportation path P1 is transported through the middle transportation path M and conveyed by means of first transportation rollers 6, middle transportation rollers 16, and second transportation rollers 7 to the straight transportation path G2 on the exit or discharge side with the transportation direction changed 180 degrees relative to the transportation direction on the in-feed side. The check S is then discharged from the exit 4 in the direction of arrow B by way of discharge rollers 8.

As shown in FIG. 2 or FIG. 3, the bottom of the first transportation path P1 is held at a height L1, and the checks S are transported along the bottom of the first transportation path P1, including middle transportation path M, such that the bottom edge of the check S is at height L1. The middle transportation rollers 16 are disposed such that if the thickness (height) of a check S is less than a specified dimension, lower pressure roller 16b and drive roller 17 contribute to transporting the check S, whereas the check S is transported by drive roller 17 and both upper pressure roller 16a and lower pressure roller 16b when the thickness of the check S is greater than or equal to this specified dimension.

As shown in FIG. 4 and FIG. 5, the second transportation path P2 is composed of middle transportation path M and card insertion opening 20 and card reversing path 21 communicating with opposite ends of middle transportation path M.

The card insertion opening 20 is an entrance for inserting a card C to the middle transportation path M. As shown in FIG. 2 and FIG. 3, bottom guides 24 and 24a are disposed at the bottom of the card insertion opening 20. These bottom guides 24 and 24a form part of the outside guide 2a, and hold the bottom edge of the card C at height L2. A card C is thus guided by these bottom guides 24 and 24a, inserted to the middle transportation path M, and transported with the bottom edge thereof at height L2. More specifically, the bottom of the second transportation path P2 is held at height L2 based on these bottom guides 24 and 24a. A check S transported at height L1 through first transportation path P1 is curved in the forward direction of travel by bottom guide 24a and transported toward exit 4.

Upper pressure roller 16a is mounted above the height L2 of second transportation path P2, and a card C conveyed into the middle transportation path M is transported through the middle transportation path M by this upper pressure roller 16a and drive roller 17.

The card reversing path 21 is formed by straight guides 21a and 21b formed in line with an extension to the left of the middle transportation path M as seen in FIGS. 4 and 5. A reversing transportation roller 22 is disposed near the end 21c of this card reversing path 21. The reversing transportation roller 22 conveys a card C transported from the middle transportation path M a specific length to the outside from end 21c of card reversing path 21, and then conveys the partially ejected card C from the card reversing path 21 back into the middle transportation path M.

More specifically, when a card C is inserted from the card insertion opening 20 to the middle transportation path M, it is transported to the card reversing path 21 by upper pressure roller 16a and drive roller 17. The card C is then reversed from the card reversing path 21 by the reversing transportation roller 22, and transported back through the middle transportation path M to exit from the card insertion opening 20. The card C is transported at this time with the bottom edge thereof held in the second transportation path P2 at height L2. In this embodiment of the invention the height L2 of second transportation path P2 is located at a position higher than height L1 of the first transportation path P1. Thus, a card C passes through the middle transportation path M at a position higher than a check S.

By using a different transportation height for the check S relative to the height for the card C as described above, this embodiment of the present invention can transport different types of scanned media through a U-shaped first transportation path and a straight second transportation path without providing special switching means.

If outside guide 2a is disposed to the curved transportation path R2 at a height above the middle transportation path M part of the second transportation path P2 (that is, height L2 or higher), the outside guide could interfere with the card C when it is reversed and its end moves from the top-side middle transportation path M to the card insertion opening 20 side, and the card C may not be conveyed in a straight line. Therefore, as shown in FIG. 2, the outside guide 2a is absent at the height (a height of L2 or greater, above the bottom guide 24a) of the upper middle transportation path on which the card C is transported on the discharge-side curved transportation path R2 in the check S transportation direction.

When the height of the check S reaches the area on the top side of the middle transportation path M, the check S is not guided in the upper part of the middle transportation path M but the check S is sufficiently guided on the lower part of the middle transportation path M, and is therefore transported without problem through the first transportation path P1.

By changing the transportation height of the check S and card C as described above, this embodiment of the present invention can transport different types of scanned media through a U-shaped first transportation path and a straight second transportation path without providing special switching means.

As shown in FIG. 2, an inside guide 2b is disposed at the height of the upper middle transportation path in the curved transportation path on the discharge side in the check S transportation direction, but an embodiment in which this inside guide 2b is not provided is also conceivable.

Furthermore, as shown in FIG. 3, an outside guide 2a and inside guide 2b are disposed at the height of the upper middle transportation path in the curved transportation path on the inlet side in the check S transportation direction, but an embodiment in which these are not provided is also conceivable.

Furthermore, cards C are transported in the middle transportation path M at a position or height (height L2) which is spaced above the bottom of the middle transportation path (height L1). A mechanism as hereafter described is disposed near the second transportation path P2 to prevent the card C from descending below height L2 where it could interfere with the transportation of a check S along the middle transportation path at height L1. A first image scanning sensor 11 and a second image scanning sensor 12 for image scanning are disposed along the middle transportation path M. This first image scanning sensor 11 and second image scanning sensor 12 are contact image sensors (CIS) that illuminate one side of a check S or card C conveyed through the middle transportation path M and detect the light reflected from the check S or card C. The first image scanning sensor 11 and second image scanning sensor 12 capture a two-dimensional image of the check S or card C by scanning line by line the check S or card C conveyed through the middle transportation path M. The height of both the first image scanning sensor 11 and the second image scanning sensor 12 are disposed across the entire height of the middle transportation path M to enable each sensor to capture a full image of the check S or card C passing through the middle transportation path M.

An upper pressure member 11a and a lower pressure member 11b for pressing checks S from the back side thereof against the image scanning surface of the first image scanning sensor 11 are disposed opposite the first image scanning sensor 11. In this embodiment of the invention the pressure members 11a and 11b have an axis of rotation and are configured so that by means of spring force they can independently press a check S against the first image scanning sensor 11. Various other methods of applying this pressure are also conceivable. It should be noted that the upper pressure member 11a is disposed at the height of the upper middle transportation path, and the lower pressure member 11b is disposed at the height of the bottom of the upper middle transportation path.

An upper pressure member 12a and lower pressure member 12b for pressing a check S from the back thereof against the image scanning surface of the second image scanning sensor 12 are likewise disposed opposite the second image scanning sensor 12. The effect of this upper pressure member 12a and lower pressure member 12b is the same as that of the upper pressure member 11a and lower pressure member 11b.

A TOF (top of form) detector 10 and BOF (bottom of form) detector 9 for detecting the trailing edge of a check S are disposed along the first transportation path P1. The BOF detector 9 is disposed between the paper supply part 3 and first transportation rollers 6 for detecting a check S inserted from the paper supply part 3 in a configuration so that the BOF detector 9 detects the trailing edge of the check S by detecting the moment the check S passes the BOF detector 9. The TOF detector 10 is disposed between the first transportation rollers 6 and first image scanning sensor 11, and is configured to detect the leading edge of the check S. The length of a check S can thus be accurately measured by detecting the leading edge and trailing edge of the check S by means of BOF detector 9 and TOF detector 10. The data reading apparatus 1 of this embodiment is configured to operate based on check S detection by the BOF detector 9 and TOF detector 10. That is, scanning a check S by the image scanning sensors 11, 12 is controlled based on the starting and stopping output of BOF detector 9 and TOF detector 10 respectively. It should be noted that either of the image scanning sensors 11, 12 could also be used as the sensor for detecting the leading edge of the check S, in which case the TOF detector 10 can be omitted.

A print head 14 is disposed in the straight part of the first transportation path P1 between the second transportation rollers 7 and discharge rollers 8. This print head 14 is used for endorsing a check S, and could be used as needed to print the check S.

A TOC (top of card) detector 26 and a BOC (bottom of card) detector 25 for detecting the trailing edge of a card C are disposed to the second transportation path P2. The BOC detector 25 is located near the card insertion opening 20 to detect a card C inserted from the card insertion opening 20, and operates to detect the trailing edge of the card C by detecting when the card C passes the BOC detector 25. The TOC detector 26 is disposed between the middle transportation rollers 16 and second image scanning sensor 12, and is configured to detect the leading edge of the card C. The length of the card C can be accurately measured by the BOC detector 25 and TOC detector 26 thus detecting the leading edge and trailing edge of the card C. The data reading apparatus 1 according to this embodiment of the invention is configured to operate based on detection of a card C by the BOC detector 25 and TOC detector 26. That is, scanning the card C by means of image scanning sensor 11 or 12 is controlled based on the starting and stopping output from BOC detector 25 and TOC detector 26 respectively. It should be noted that either of the image scanning sensors 11, 12 could be used to detect the leading edge of the card C, in which case the TOC detector 26 can be omitted.

An MICR (magnetic image character reader) 13 is disposed below the drive roller 17. MICR 13 is a sensor for reading magnetic ink character information printed with magnetic ink on the check S. The MICR 13 reads the check S when it is pressed to the surface of the MICR 13 by a pressure lever 30 disposed opposite the MICR 13 with the middle (now shown) transportation path M therebetween.

A displacement sensor for detecting the thickness of the check S by sensing the displacement of this pressure lever 30 could be provided, if needed, for detecting when multiple checks S are fed together. More specifically, if a displacement sensor is provided, displacement of the pressure lever 30 is detected, and if the displacement of pressure lever 30 is greater than or equal to a specified amount, it can be used to determined that two or more checks S are being conveyed together.

Transporting a Check

Reading data from a check S and printing a check S using this data in reading apparatus 1 are described hereinafter.

First, the check S is generally inserted to the paper supply part 3 with the front facing the inside guide 2b so that the endorsement can be printed by the print head 14. The check S is then carried from the paper supply part 3 to first transportation path P1 in the direction of arrow A in FIG. 5. The check S could be loaded manually or by a mechanical feeding mechanism. Multiple checks S could also be stocked in the paper supply part 3 with a sheet feeder mechanism disposed to the paper supply part 3 supplying the checks S one at a time into the first transportation path P1.

Assuming the checks S are inserted one by one, the drive roller 6a of first transportation rollers 6 starts turning when the leading edge of the check S is detected by the BOF detector 9. A single motor can drive the first transportation rollers 6, second transportation rollers 7, middle transportation rollers 16, and discharge rollers 8 and all of the rollers can be rotated simultaneously. Alternatively, the rollers could, of course, be driven independently. When the BOF detector 9 detects a check S in this embodiment, an interlock engages to prevent the second transportation mechanism that transports cards C from operating.

Inserting the checks S one by one is described next. When a check S is pushed further into the first transportation path P1, the leading edge of the check S reaches first transportation rollers 6. Of the first transportation rollers 6, pressure roller 6b is urged by spring force toward the drive roller 6a, and the check S is grabbed smoothly by the drive roller 6a and pressure roller 6b. The check S is then conveyed by rotation of first transportation rollers 6 inside the first transportation path P1 along the wall of the U-shaped outside guide 2a.

When the leading edge of the check S transported by the first transportation rollers 6 reaches the TOF (top of form) detector 10, the power supply to the first image scanning sensor 11, second image scanning sensor 12, and MICR 13 disposed downstream from there is turned on. A data reading apparatus 1 according to this embodiment of the invention supplies power only when needed, including to drive the rollers, and is constructed to prevent unnecessary power consumption.

The check S is then transported to the first image scanning sensor 11 disposed on the outside guide 2a side, and a first image of the back of check S is captured with the check S pressed against the image scanning surface of the first image scanning sensor-11 by pressure members 11a, 11b. If the height of the check S reaches the area of the upper middle transportation path, both upper pressure member 11a and lower pressure member 11b press the check S to the first image scanning sensor 11. Cards C are transported along the upper middle transportation path, and therefore contact only the upper pressure member 11a.

The check S is then carried to the second image scanning sensor 12 disposed on the inside guide 2b side, and an image of the check S front is captured. Scanning by the second image scanning sensor 12 is the same as scanning with the first image scanning sensor 11.

Information preprinted in magnetic ink on the check S is then read from the check S by the MICR 13 disposed on the inside guide 2b side. The MICR 13 normally reads magnetic ink text printed along the bottom of the check S, and is therefore disposed only at the bottom of the middle transportation path M.

The front and back images of the check S captured by the first and second image scanning sensors 11, 12 can be sent to a host computer, or processed by a processor in the data reading apparatus 1. The captured images could also be presented on a display for visual inspection of the check S. This display can be provided separately or as part of the data reading apparatus 1 itself.

The leading edge of the check S then reaches the second transportation rollers 7. The check S is grabbed between drive roller 7a and pressure roller 7b, and is conveyed to the exit 4 side by rotation of drive roller 7a.

The check S enters the straight transportation path on the discharge side after passing the U-shaped part. The back of the check S is then printed as the check passes a position opposite the print head 14. The print head 14 is stationary, and the check S is therefore printed as it moves passed the print head 14. It will be obvious that a configuration in which the check S is stopped and the print head 14 is moved to print is also possible.

While the outside guide 2a is between the print head 14 and check S here, there is an opening at this printing position 18 and there is no obstruction between the print head 14 and check S. A mechanism for retracting and protecting the print head 14 at a standby position when not printing could also be provided.

After the check S is printed by the print head 14, it is discharged in the direction of arrow B by discharge rollers 8. More specifically, the check S is grabbed between drive roller 8a and pressure roller 8b, and is conveyed in the direction of arrow B outside of first transportation path P1 by rotation of the drive roller 8a. This completes this check S processing sequence.

A check S is thus transported along a U-shaped transportation path, makes a 180 degree U-turn, and is discharged from the same side as the insertion side. The operator can therefore easily insert a check S while remaining seated, and then easily remove the check S after a specific process has been run in the first transportation path P1.

Card Transportation

Transportation of a card C along the second transportation path P2 is described in detail next with reference to FIG. 6.

When a card C is inserted from the direction of arrow C to the BOC detector 25 toward card insertion opening 20, the BOC detector 25 detects the leading edge of the card C, starts rotation of the pressure rollers 16 and reversing transportation roller 22, and turns the first and second image scanning sensors 11, 12 on. That is, as with the first transportation path P1, power to the second transportation path P2 turns on only when needed, and is thus designed to prevent unnecessary power consumption. When the card C is detected by the BOC detector 25, an interlock engages so that the first transportation mechanism for transporting checks S does not operate.

Figure 6A:
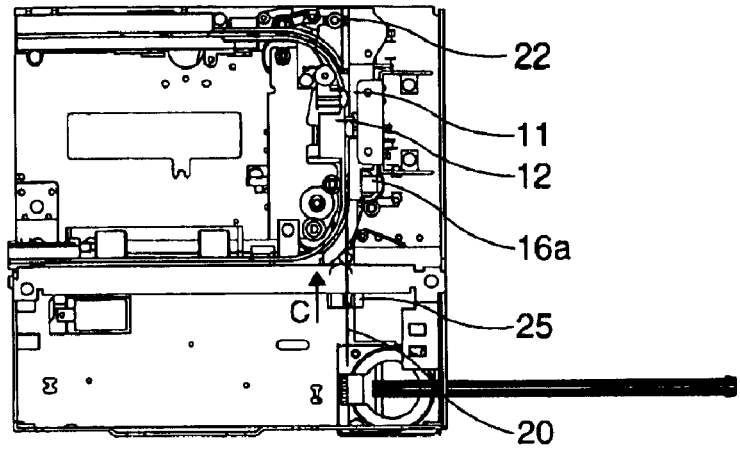
FIG. 6(a-c) show different positions of a second scanned medium along the second transportation path P2.

When a card C is inserted to the second transportation path P2 by manual or mechanical means, the leading edge of the card C reaches the pressure rollers 16 as shown in FIG. 6(a). More specifically, the card C is grabbed between upper pressure roller 16a and drive roller 17 as a result of being inserted at height L2 with the card bottom guided by the upper part of the middle transportation path M, that is, by outside guide 2a. The card C is then conveyed toward the reversing transportation roller 22 by drive roller 17 and upper pressure roller 16a. When the BOC detector 25 then detects the trailing edge of the card C and the TOC detector 26 detects the leading edge of the card C, the length and reference position for transporting the card C are set.

Once the reference position for card C transportation and the card C length have been set, the transportation position of the card C can be controlled by detecting the number of steps of the stepping motor driving the upper pressure roller 16a and drive roller 17 because the location of the BOC detector 25, and the distance to the upper pressure roller 16a, first and second image scanning sensors 11, 12, and reversing transportation roller 22 are already known.

Figure 6B:
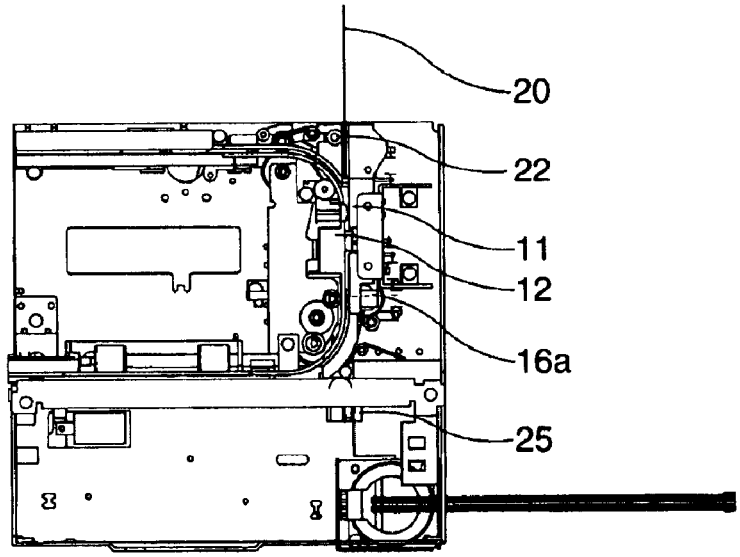
Figure 6C:
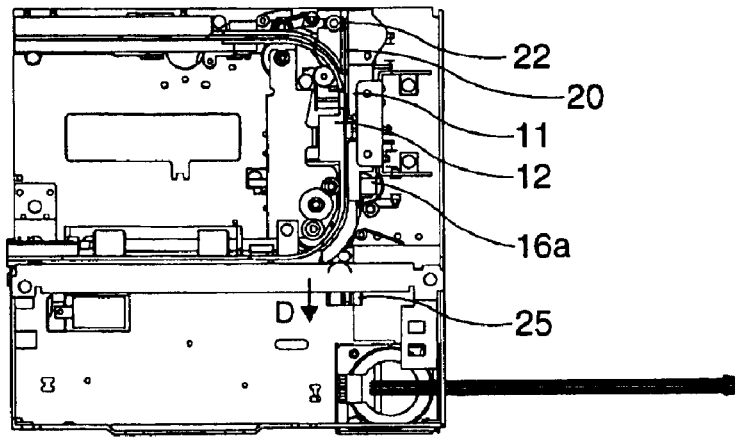

When the card C is transported by the upper pressure roller 16a and drive roller 17, the leading edge of the card C is grabbed by reversing transportation roller 22. By detecting the number of steps advanced by the stepping motor, the card C is then stopped as shown in FIG. 6(b) after the trailing edge of the card C has been conveyed to a specific point separated from the first image scanning sensor 11. Using this position as the reversal starting point, rotation of the reversing transportation roller 22 is then reversed, and the card C is conveyed in the reverse direction through the same second transportation path P2 that it just passed.

An image of each side of the card C is then captured as the card C passes the first image scanning sensor 11 and second image scanning sensor 12. The card C is pushed to the first and second image scanning sensors 11, 12 by upper pressure members 11a and 12a at the position shown in FIG. 6(c). When the first and second image scanning sensors 11, 12 finish scanning, the card C is discharged in the direction of arrow D from the card insertion opening 20. This completes this card C processing sequence.

Cards C are inserted to the second transportation path P2 in the opposite direction from the check S transportation direction in this embodiment, but if the BOC detector 25 is placed on the opposite side, then a layout enabling inserting the card C to the second transportation path P2 in the same direction as the check S transportation direction can be achieved.

Because this embodiment of the invention has a TOC detector 26 disposed at a position before the first and second image scanning sensors 11, 12 are reached, in addition to the BOC detector 25 located at the entrance where the leading edge of the card C is detected and power to the drive motor, for example, turns on, the card C could be transported in one direction and the scanning operation completed without reversing the card C by detecting the leading edge of the card C and setting a reference position for card transportation.

Dropping Prevention Mechanism

Cards C travel the top side of the second transportation path P2 with the height at which the card C is transported maintained by the bottom guide 24 on the card insertion opening 20 side and by the bottom of transportation part (end) 21c in the card reversing path 21. The height is basically maintained by gripping with the upper pressure roller 16a in the upper middle transportation path so that the card does not drop while being transported, but the dropping prevention mechanism described below is also provided.

Figure 7:
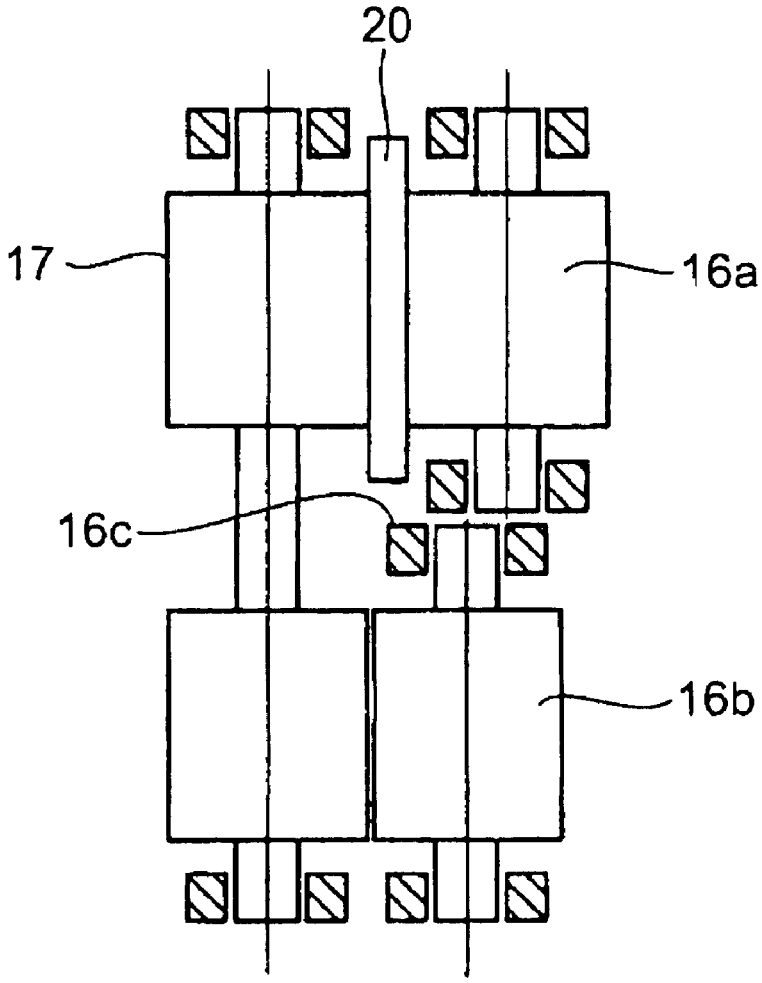
FIG. 7 is a schematic diagram of the upper and lower pressure rollers.

FIG. 7 is a schematic section diagram showing the relationship between upper pressure roller 16a, lower pressure roller 16b, and the drive roller 17.

As shown in FIG. 7, of the upper pressure roller 16a and lower pressure roller 16b, only upper pressure roller 16a engages card C. Generally speaking, if a single solid roller is used and a card C of a certain thickness is grabbed only by the top end of the roller, the resulting single-sided contact skews the roller such that the card may not be transported normally. The roller is therefore divided top and bottom into an upper pressure roller 16a and lower pressure roller 16b.

Furthermore, if an elastic material such as rubber is used on the surface of pressure rollers 16a, 16b, the upper pressure roller 16a will deform according to the thickness of the grabbed card C, but the lower pressure roller 16b therebelow does not deform. Therefore, if the transportation height of the card C drops, the card C can be supported from below by the top of the support member 16c supporting the lower pressure roller 16b. More specifically, the lower pressure roller 16b can be used as a dropping prevention member supporting the card C.

Figure 8:
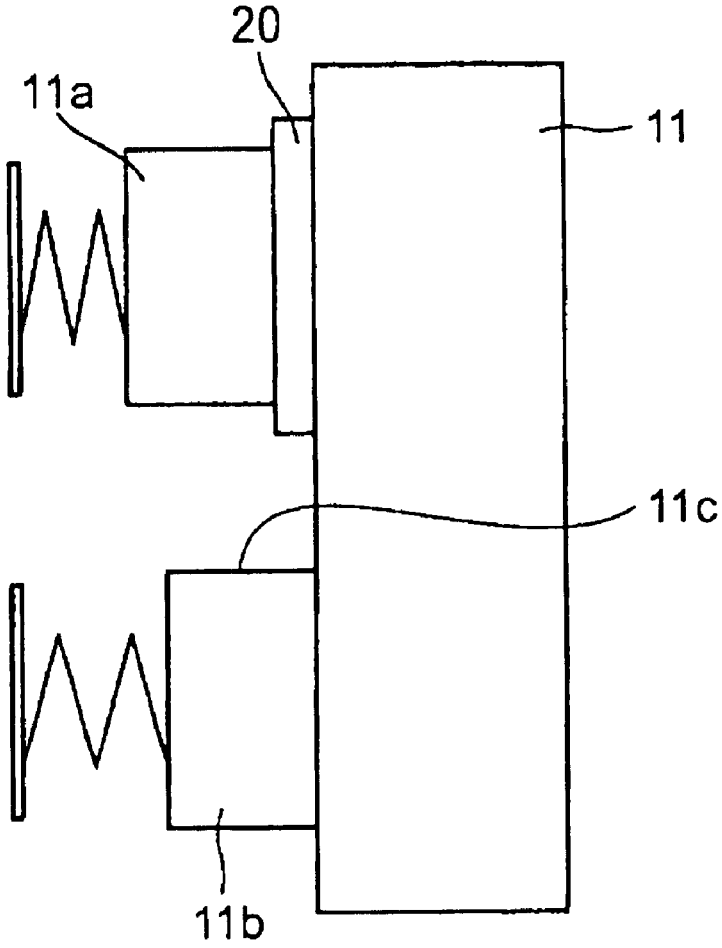
FIG. 8 is a schematic diagram of the upper and lower pressure members.

A dropping prevention member is also associated with the first and second image scanning sensors 11, 12 in this embodiment. As shown in FIG. 8, an upper pressure member 11a and a lower pressure member 11b extend from the first image scanning sensor 11 for pressing a check S from the back thereof against the first image scanning sensor 11. When transporting a card C, the upper pressure member 11a will press the card C against the first image scanning sensor 11 but the lower pressure member 11b which directly contacts the first image scanning sensor 11 will not because there is no intervening scanning medium at that height. The card C can therefore be supported from the bottom by the top surface 11c of the lower pressure member 11b in the event the transportation height of the card C drops while the card is being transported. In other words, the lower pressure member 11b will function as a dropping prevention member for cards C.

The second image scanning sensor 12 can also function as a dropping prevention member for second scanned media in the same way as first image scanning sensor 11. It will thus be apparent that card C dropping prevention members in this embodiment of the invention maintain the heightwise position of the card C so that it does not drop further to a level below height L2 where it can interfere with transportation of a check S.

Pressure on Checks and Cards

Checks S and cards C are generally made of different materials and thickness, and the pressure needed to scan checks S and cards C using first image scanning sensor 11 and second image scanning sensor 12 is therefore generally different. A pressure member capable of varying the pressure applied to checks S and cards C is therefore described below using by way of example an upper pressure member 130 and lower pressure member 140 whereby checks S and cards C are pressed against the second image scanning sensor 12.

The construction of the upper pressure member 130 is described first.

Figure 9:
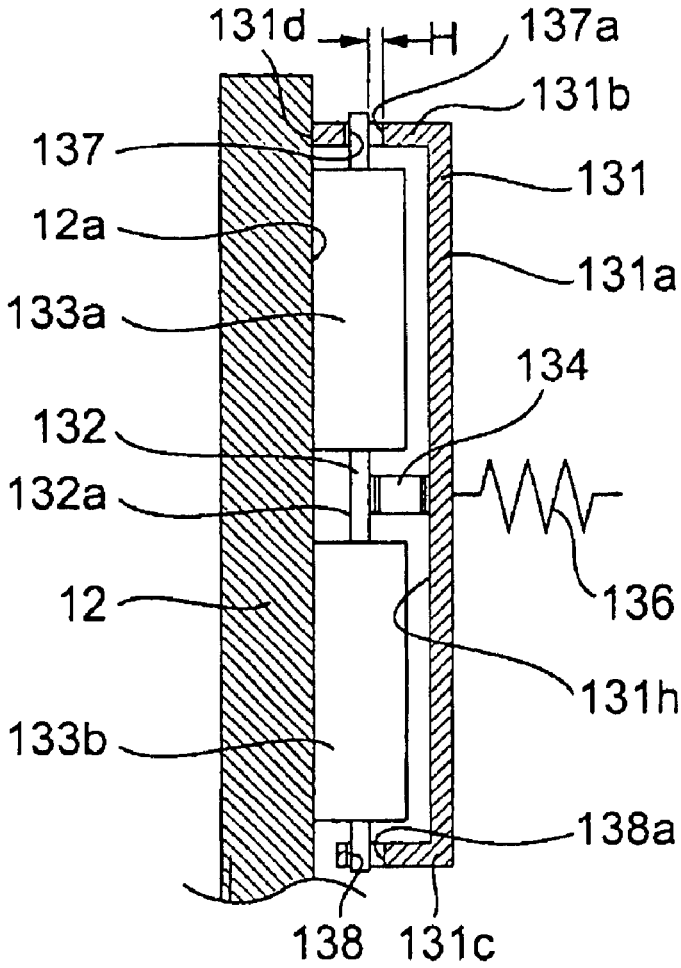
FIG. 9 is a schematic section diagram of the first pressure member.

The upper pressure member 130 is disposed at a second reference height (height L2), that is, at a reference height L2 with respect to the second transportation path on which cards C are conveyed. As shown in FIG. 9, this upper pressure member 130 has a first movable guide 131, first rotary shaft 132, first rollers 133a and 133b, first compression spring 134, and spring 136.

The first movable guide 131 has an upper shaft support part 131b and a lower shaft mounting part 131c formed integrally at the ends of a guide base 131a, which is a long member disposed parallel to the height direction, by bending said ends at a right angle toward the image scanning sensor 12 so that in section view it forms a shallow C-shaped overall geometry (see FIG. 9). The upper shaft support part 131b protrudes farther than the lower shaft mounting part 131c toward the image scanning surface 12a of the image scanning sensor 12, and the distal end 131d of the upper shaft support part 131b forms a stop for contacting the image scanning surface 12a of the image scanning sensor 12.

As shown in FIG. 9, long holes 137, 138, i.e. with the long axis of the holes substantially perpendicular to the card transportation direction, are disposed to the upper shaft support part 131b and lower shaft support part 131c at a position in the heightwise direction. A first rotary shaft 132 on which the first rollers 133a and 133b are mounted is inserted to these long holes 137, 138 and installed so that the first rotary shaft 132 is parallel with the image scanning surface (12a side) of the image scanning sensor 12. The first rollers 133a and 133b are mounted coaxially to the first rotary shaft 132 with a specific distance therebetween, and disposed so that the tops and bottoms and part of the sides are substantially covered by the first movable guide 131. The first rotary shaft 132 is slidable lengthwise to long hole 137, that is, slidable perpendicularly to the image scanning surface (12a side) of the image scanning sensor 12.

As shown in FIG. 9, a compression spring 134 is disposed between the inside surface 131h of guide base 131a and middle part 132a, which is between the first rollers 133a and 133b of first rotary shaft 132. This compression spring 134 urges first rotary shaft 132 to the image scanning sensor 12 from guide base 131a, and the first rollers 133a and 133b are therefore pressed against the image scanning surface 12a of the image scanning sensor 12.

The first movable guide 131 is urged by spring 136 toward second image scanning sensor 12, and is positioned with the distal end 131d of the upper shaft support part 131b in contact with the image scanning surface 12a of the image scanning sensor 12.

When there is no check S or card C on the image scanning surface 12a of image scanning sensor 12 and the distal end 131d of upper shaft support part 131b is positioned in contact with the image scanning surface 12a of image scanning sensor 12, the distance between first rotary shaft 132 and the lengthwise ends 137a, 138a (that is, the side farthest from image scanning sensor 12) of long holes 137, 138 is specified distance H.

The spring constant of spring 136 is set greater than the spring constant of the compression spring 134, and the force with which spring 136 pushes on the image scanning surface 12a of image scanning sensor 12 by way of intervening distal end 131d of upper shaft support part 131b is set greater than the force with which the compression spring 134 pushes on the image scanning surface 12a of image scanning sensor 12 by way of intervening first rotary shaft 132 and first rollers 133a and 133b.

When the distal end 131d of upper shaft support part 131b contacts image scanning surface 12a, the force of spring 136 is balanced with the sum of the resistive force (reaction) of the image scanning surface 12a and the urging force of compression spring 134. Furthermore, the force of the compression spring 134 pushing on the image scanning surface 12a through first rollers 133a and 133b is unaffected by the force of spring 136, and is determined only by the spring constant and compression of the compression spring 134.

The construction of the upper pressure member 130 is as described above.

The construction of the lower pressure member 140 is described next with reference to FIG. 10.

Figure 10:
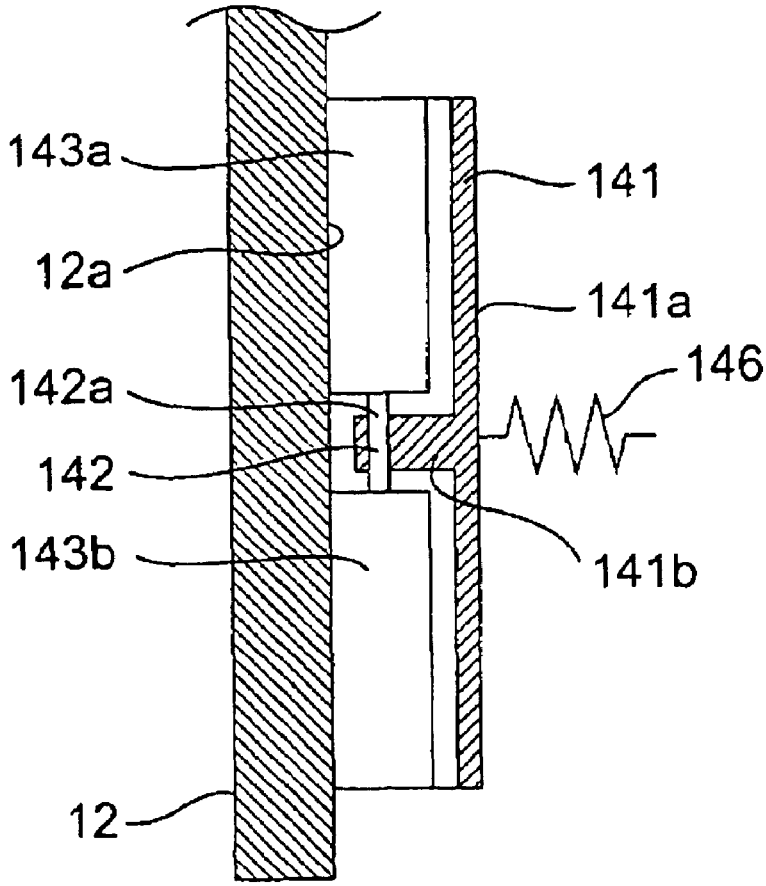
FIG. 10 is a schematic section diagram of the second pressure member.

FIG. 10 is a schematic section diagram of the lower pressure member 140.

The lower pressure member 140 is disposed at a first reference height (height L1), that is, displaced a distance or height from the first transportation path through which checks S are transported. As shown in FIG. 10, this lower pressure member 140 has a second movable guide 141, second rotary shaft 142, second rollers 143a and 143b, and spring 146.

The second movable guide 141 has a shaft support part 141b formed integrally to the longitudinal middle of a guide base 141a, which is a longitudinal member disposed parallel to the heightwise direction. The center connecting part 142a of the second rotary shaft 142 to which the second rollers 143a and 143b are disposed is freely rotatably mounted in the shaft support part 141b. The second rollers 143a and 143b are mounted coaxially to the second rotary shaft 142 above and below the center connecting part 142a of the second rotary shaft 142 with a specific gap therebetween. The second rollers 143a and 143b are pressure members for pressing a check S or card C to the image scanning surface 12a of image scanning sensor 12, and are disposed to rotate with the second rotary shaft 142. Unlike the first rotary shaft 132, this second rotary shaft 142 is not directly urged by an elastic member such as a compression spring.

The second movable guide 141 is urged by spring 146 toward the second image scanning sensor 12, and is positioned by the second rollers 143a and 143b contacting image scanning surface 12a of image scanning sensor 12.

The spring constant of spring 146 is equal to the spring constant of the compression spring 134 of upper pressure member 130, and the force with which the spring 146 pushes against the image scanning surface 12a of image scanning sensor 12 by means of second rollers 143a and 143b is set substantially equal to the force with which compression spring 134 pushes on the image scanning surface 12a of image scanning sensor 12 by way of first rollers 133a and 133b.

In this embodiment of the invention the compression spring 134 of upper pressure member 130 and the spring 146 of lower pressure member 140 are weak springs for pressing checks S and thin cards C, and the spring 136 of upper pressure member 130 is the strong spring for pressing thick cards C.

The construction of the lower pressure member 140 is as described above.

Figure 11:
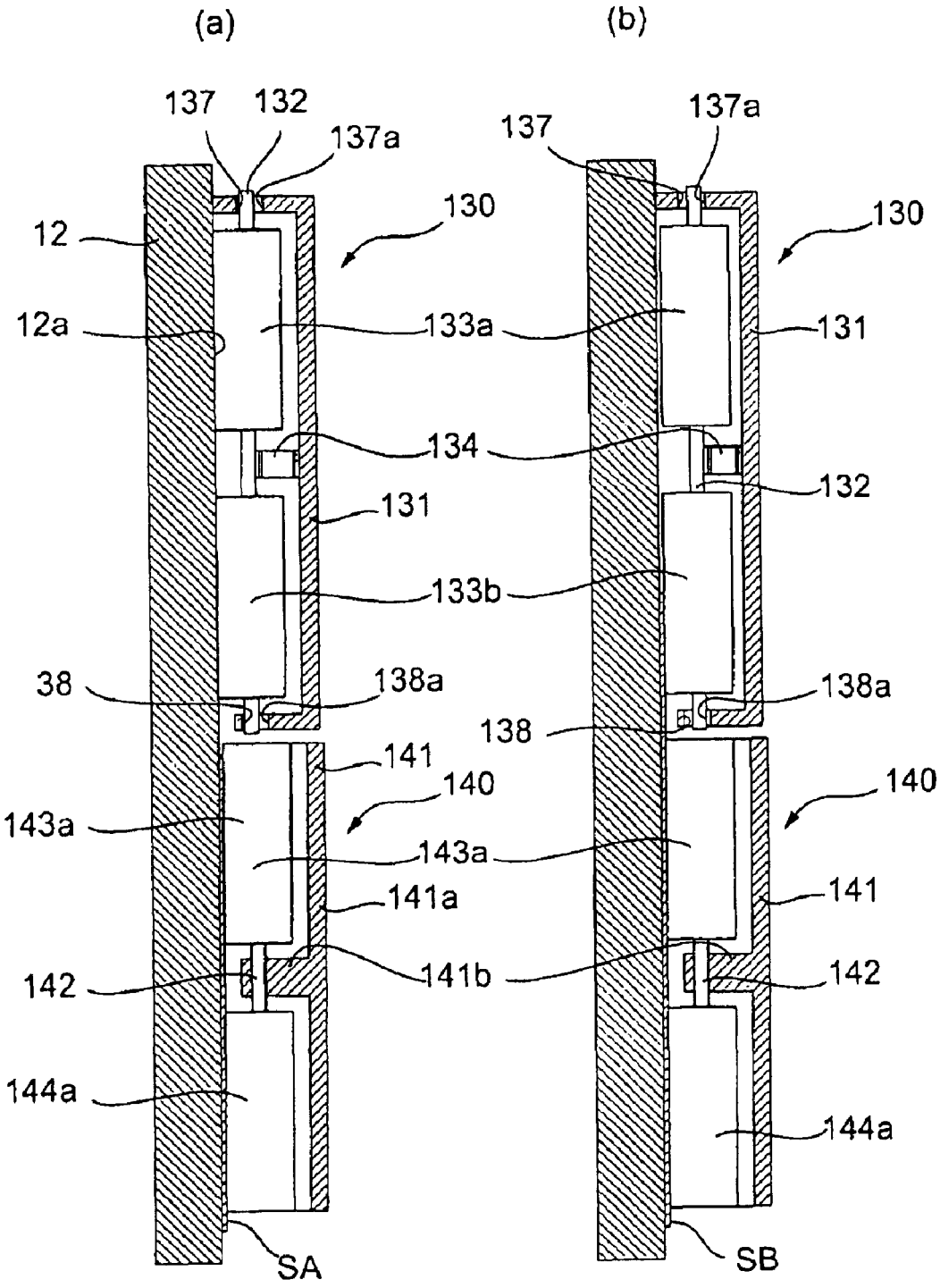
FIG. 11(a-b) describe the operation of the first pressure member and second pressure member for transporting a narrow and a thicker check S, respectively.
Figure 12:
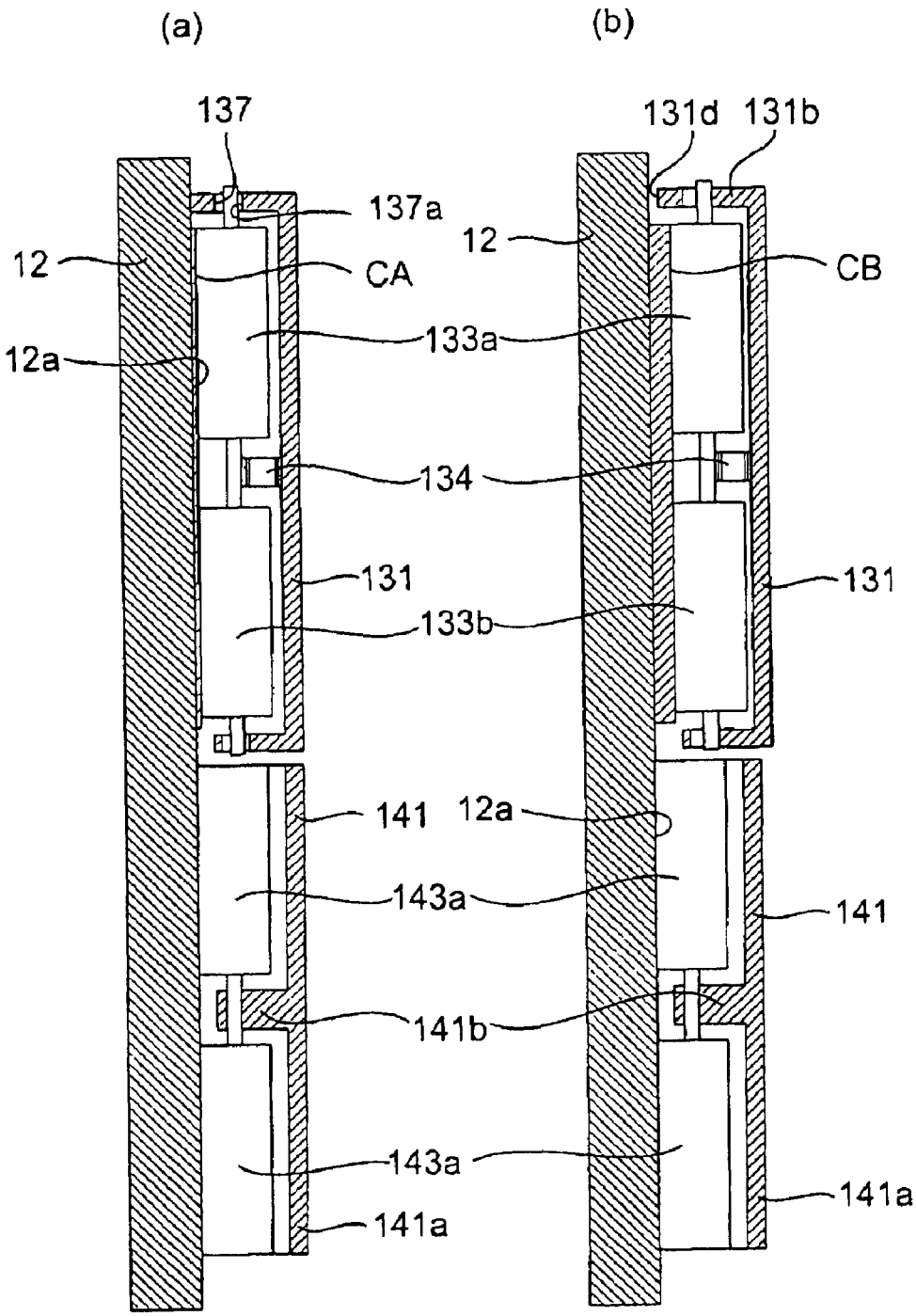
FIG. 12(a-b) describe the operation of the first pressure member and second pressure member for transporting a narrow and thicker card C along the second transportation path P2 respectively.

Operation of the upper pressure member 130 and lower pressure member 140 is described next with reference to FIG. 11 and FIG. 12. The work of each spring is also described below while describing the operation of the upper pressure member 130 and lower pressure member 140.

Scanning a narrow check SA is described first.

A narrow check SA is transported through first transportation path P1 at the first reference height (height L1). As shown in FIG. 11(a), the check SA carried to the second image scanning sensor 12 is conveyed between the second rollers 143a and 143b of lower pressure member 140 and the image scanning surface 12a of second image scanning sensor 12. The check SA is pressed to the image scanning surface 12a by the urging force of spring 146 transmitted through second rollers 143a and 143b of lower pressure member 140 while the second movable guide 141 is turned. In other words, the check SA is pressed by the weak pressure from spring 146. The image scanning sensor 12 then exposes the check S traveling in the form transportation direction to capture an image of the check SA.

Scanning a wide ("thicker") check SB is described next. It is assumed here that the thickness of this check SB is greater than second height L2.

A check SB is transported through the first transportation path P1 at the first height (height L1) in the same way as a narrow check SA. When a check SB is carried to the second image scanning sensor 12, the bottom part is fed between the second rollers 143a and 143b of lower pressure member 140 and the image scanning surface 12a of second image scanning sensor 12, and the top part is fed between first rollers 133a and 133b of upper pressure member 130 and image scanning surface 12a of second image scanning sensor 12, as shown in FIG. 11(b).

The top part of the check SB pushes against the first movable guide 131, vertically displacing the first rotary shaft 132 to the image scanning surface 12a while simultaneously the bottom part of the check SB pushes and turns the second movable guide 141. The top part of the check SB is thus pressed to the image scanning surface 12a by the urging force of the compression spring 134 by way of first rollers 133a and 133b of the upper pressure member 130, and the bottom part is pressed to the image scanning surface 12a by the urging force of spring 146 by way of the second rollers 143a and 143b of lower pressure member 140. That is, the check SB is pressed by the weak force of compression spring 134 and spring 146. The image scanning surface 12a then illuminates the check SB as it is thus held and conveyed in the form transportation direction, and captures an image of the check SB.

In other words, when the thickness of the check SB is of a height L2 or greater, the lower pressure member 140 presses the bottom part of the check S and the first rollers 133a and 133b of the upper pressure member 130 press the top part of the check S. The pressure of this compression spring 134 on the top part of the check SB is substantially equal to the pressure of spring 146 on the bottom part of the check SB. Therefore, the check SB is pressed with uniform force in the bottom part and top part, and feed problems arising from uneven force being applied in the thickness direction of the check do not occur.

Scanning a thin card CA (thickness ha) is described next with reference to FIG. 12.

When a thin card CA is inserted into the card insertion opening 20 it is transported at the second reference height (height L2), along the second transportation path P2, until it passes the second image scanning sensor 12 once, whereupon it is then conveyed to the card reversing path 21. It is then reversed at the card reversing path 21 and transported again to the second image scanning sensor 12. The card CA reaching the second image scanning sensor 12 is fed between the first rollers 133a and 133b and image scanning surface 12a of image scanning sensor 12 as shown in FIG. 12(a). The card C at this time pushes the first rollers 133a and 133b and displaces the first rotary shaft 132 away from the image scanning sensor 12 along long holes 137, 138.

The thickness ha of this card CA is such that the first rotary shaft 132 does not push on the lengthwise ends 137a, 138a of the long holes 137, 138 (ha<H), and the distal end 131d of upper shaft support part 131b therefore remains in contact with the image scanning surface 12a. The first rollers 133a and 133b are therefore pushed only by the compression spring 134, and are not affected by force from spring 136. As a result, the card CA is pressed to the image scanning surface 12a by means of the urging force of compression spring 134 by way of first rollers 133a and 133b of upper pressure member 130. That is, the card CA is pressed by the weak force of the compression spring 134. The image scanning sensor 12 then illuminates the card CA as it is thus held and conveyed in the paper transportation direction, and captures an image of the card CA.

Scanning a thick card CB (thickness hb>H) is described next.

When a thick card CB is inserted from the card insertion opening 20 at the second reference height (height L2) in the same way as a thin card CA, the card CB is transported along the second transportation path P2, passes the front of second image scanning sensor 12 once, and is then conveyed to the card reversing path 21. The card CB is then reversed in the card reversing path 21 and transported back to the second image scanning sensor 12. A card CB thus conveyed to the second image scanning sensor 12 is fed between first rollers 133a and 133b and image scanning surface 12a of image scanning sensor 12 as shown in FIG. 12(b).

The card CB in this case pushes the first rollers 133a and 133b and displaces the first rotary shaft 132 away from the image scanning sensor 12 along long holes 137, 138. Because the thickness hb of this card CB is greater than the specified distance H, the first rotary shaft 132 pushes against the lengthwise ends 137a, 138a (on the side away from the image scanning sensor 12) of the long holes 137, 138, and the distal end 131d of the upper shaft support part 131b separates from the image scanning surface 12a of image scanning sensor 12. As a result, the card CB is pressed to the image scanning surface 12a by the urging force of spring 136 by way of intervening first rollers 133a and 133b of upper pressure member 130. That is, the card CB is pressed by the strong force of spring 136. The image scanning sensor 12 then illuminates the card CB as it is thus held and conveyed in the paper transportation direction, and captures an image of the card CB.

To summarize, the first rollers 133a and 133b are configured so that the applied pressure changes suddenly and nonlinearly at a specified length according to the thickness of the card C. More specifically, an upper pressure member 130 according to this embodiment of the invention can switch according to an inserted thickness between the pressure produced only by the compression spring 134 and the pressure produced by a spring 136.

The embodiment of the invention described above has a U-shaped first transportation path P1 and a straight second transportation path P2 sharing part of the transportation path, and by changing the height at which the medium is transported the scanner can read, i.e. take an image of both checks and other such bendable scanned media and hard-to-bend scanned media such as drivers licenses and cards using a single device not having a special switching device.

Because multiple scanning devices typically cannot be installed in the limited space available at a bank teller window, for example, it has been necessary to go to a scanner located in a separate place to acquire data from a drivers license, for example, thus reducing job productivity. The data reading apparatus 1 according to this embodiment of the invention, however, can solve this problem.

Second Embodiment

A second embodiment of a data reading apparatus according to the present invention is described next with reference to the accompanying figures.

Figure 13:
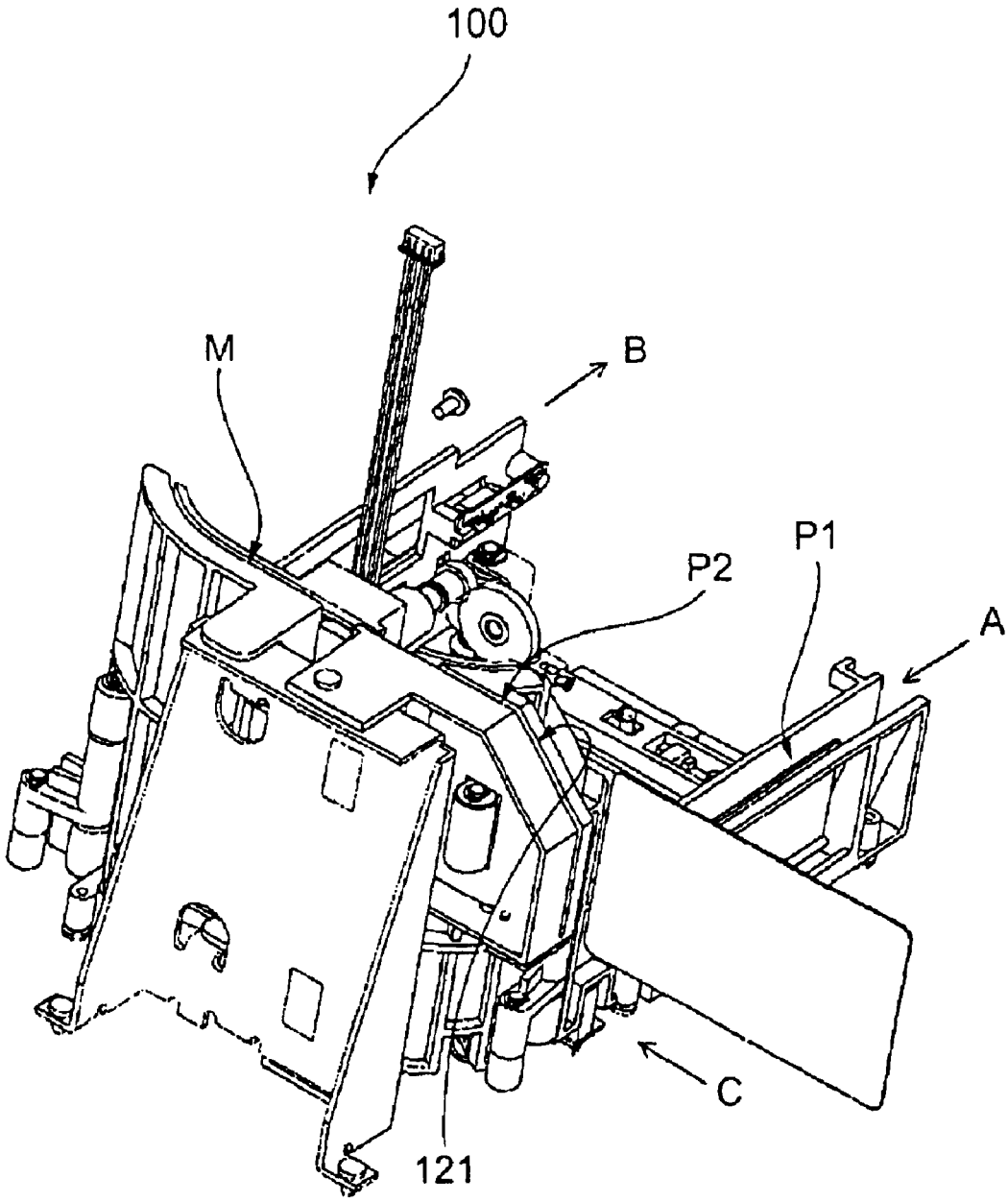
FIG. 13 is a schematic overview of a data reading apparatus having a plurality of transportation paths according to a second embodiment of the present invention.
Figure 14:
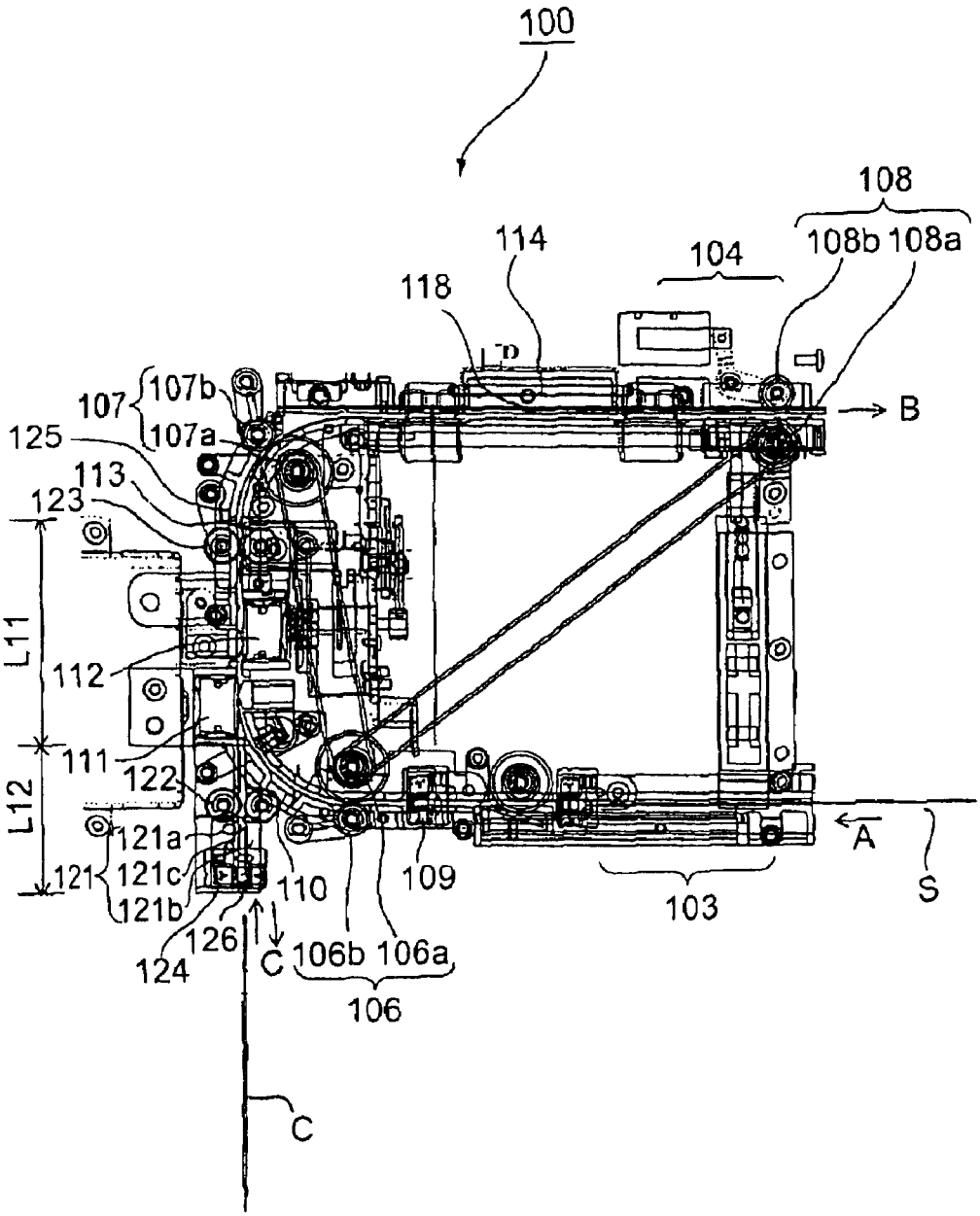
FIG. 14 is a plan view showing the data reading apparatus in detail.

FIG. 13 is an oblique view showing a data reading apparatus having a plurality of transportation paths according to this second embodiment of the present invention. FIG. 14 is a plan view showing the arrangement of various devices for this data reading apparatus.

As in the first embodiment, a data reading apparatus 100 according to this embodiment of the invention has a U-shaped first transportation path P1 for conveying a first scanned medium (check S), and a straight second transportation path P2 for conveying a second scanned medium (card C). The first scanned medium, such as a check, is composed of a foldable, bendable material. This embodiment of the invention prints by means of a print head to the first scanned medium in addition to capturing data therefrom, and the first scanned media is therefore composed of a printable material. The second scanned medium is composed of a material that is difficult to bend, such as a drivers license or credit card. A check S is therefore used as the first scanned medium and a card C as the second scanned medium.

Part of the curved transportation path in the first transportation path P1 is a straight part referred to below as the middle transportation path M. A straight connected transportation path 121 is connected to the middle transportation path M so as to form a straight line with the middle transportation path M. This middle transportation path M and connected transportation path 121 form a second transportation path P2. The first transportation path P1 and second transportation path P2 thus share this straight middle transportation path M. Various data readers for capturing data are disposed to this shared middle transportation path M.

The first transportation path P1 is described more specifically below. A first scanned medium inserted from the direction of arrow A is conveyed to the left as seen in FIG. 14, makes a 180-degree U-turn through the curved part, and is discharged to the right in the direction of B. This U-shaped first transportation path P1 is composed of outside guide 102a, inside guide 102b, and transportation part 102c, which is the space between both guides through which the medium is actually conveyed. This transportation path 102 is thus composed of in the transportation direction a straight transportation path on the entrance side, a curved transportation path bending substantially 90 degrees connected to the entrance-side straight transportation path, a straight middle transportation path M of length L11 connected to this curved transportation path, a curved transportation path bending substantially 90 degrees connected to this middle transportation path M, and a straight transportation path on the exit side connected to this curved transportation path. Two image scanning sensors 111 and 112, and MICR 113 for reading magnetic ink characters preprinted on a check S, are disposed to the middle transportation path M as data readers in this embodiment. As a check S is conveyed through this middle transportation path M, specific data is read from the check, the transportation direction of the check is changed 180 degrees from the entrance side, and the check is then transported into the straight transportation path on the exit side. The check is printed as it passes an opposing position near the print head disposed to the exit-side straight transportation path, and is then discharged in the direction of arrow B.

The first scanned medium is transported by a first transportation mechanism composed of first transportation rollers 106, second transportation rollers 107, and discharge rollers 108.

A connected transportation path 121 of length L12 is connected to the inlet side of this middle transportation path. This connected transportation path 121 is composed of outside guide 121a, inside guide 121b, and transportation part 121c disposed between both guides corresponding to the connected middle transportation path M. The connected transportation path is straight, and is connected in line with the middle transportation path. The second transportation path P2 formed by this middle transportation path and connected transportation path is therefore a completely straight transportation path, and can therefore transport hard-to-bend second scanned media with no problem.

A card C is inserted from the entrance 124 (FIG. 14) of the second transportation path P2, transported through the second transportation path P2 and scanned. The transportation direction of the card C is reversed before the leading edge of the card C reaches the curved transportation path, and is then discharged from the entrance 124. The card C is transported by a transportation mechanism composed of first reversing transportation roller 122 and second reversing transportation roller 123.

Transporting and scanning a card C can be done in the same way even if the connected transportation path 121 is connected to the exit side of the middle transportation path M. The problem with this layout, however, is that when a check S is transported and the check S passes the middle transportation path M, the check should normally curve 90 degrees following the 90 degree curve of the outside guide 102a of the transportation path, but could be conveyed toward the connected transportation path 121 straight in line with the middle transportation path M. This makes it necessary to provide a new branching device for selecting the transportation path, complicating the mechanism and creating extra costs. On the other hand, if the connected transportation path 121 is connected to the inlet side of the middle transportation path M, there is no danger of the medium being transported from the transportation direction to another transportation path even without providing other devices. The connected transportation path 121 is therefore connected to the inlet side of the middle transportation path M in this embodiment of the invention.

The operation of the device in accordance with this embodiment is further described in detail with reference to the transporting of a check S along the first transportation path P1.

Checks S are generally inserted with the front facing inside guide 102b so that the back can be printed by the print head 114.

A check S is loaded to the transportation path entrance 103 to the transportation path 102. Checks can be loaded manually or by a mechanical feeding method. An autofeeder could be provided so that a plurality of checks S can be loaded and then automatically supplied one by one to the transportation path 102.

When the scanned media are inserted one at a time, the drive roller 106a of first transportation rollers 106 starts to turn when the BOF detector 109 detects the leading edge of the check S. A single motor can drive the first transportation rollers 106, second transportation rollers 107, and discharge rollers 108, and there is no problem with all rollers turning simultaneously. The individual rollers could, of course, be independently driven. When the BOF detector 109 detects the check S, an interlock engages so that the second transportation mechanism for transporting cards C does not operate.

Operation when the checks S are inserted one by one is described next. When the check S is inserted further, the leading edge of the check S reaches first transportation rollers 106. The first transportation rollers 106 include drive roller 106a on the inside guide 102b side, and pressure roller 106b on the outside guide 102a side. The pressure roller 106b is urged toward the drive roller 106a side by spring force. The check S is therefore grabbed smoothly between the drive roller 106a and pressure roller 106b, and is fed toward the transportation path exit 104 by rotation of drive roller 106a. The check S advances along the wall of the U-shaped outside guide 102a.

When the leading edge of the check S reaches the second transportation rollers 107, the trailing edge of the check S must remain on the entrance side of the first transportation rollers 106 (leaving a feed margin for the first transportation rollers 106). Likewise, when the leading edge of the check S reaches the discharge rollers 108, the trailing edge of the check S must remain before the second transportation rollers 107 (leaving a feed margin for the second transportation rollers 107).

When the leading edge of the check S transported by first transportation rollers 106 reaches the TOF (top of form) detector 110, the power to the image scanning sensors 111, 112 and MICR 113 located downstream therefrom turns on. Power is supplied only when needed, including for driving the rollers, resulting in a mechanism that prevents unnecessary power consumption.

An image of the back of the check S is then captured by the image scanning sensor 111 disposed on the outside guide 102a side. Next, an image of the front of the check S is captured by the image scanning sensor 112 disposed on the inside guide 102b side. In addition, data preprinted to the check S using magnetic ink is read by the MICR 113 disposed on the inside guide 102b side.

Image data captured by the image scanning sensors 111, 112 can be sent to a host computer, or it can be specifically processed by the processor device of the printer comprising this print medium transportation mechanism. The captured images could also be presented on a display for visual inspection of the check S. This display can be provided separately or as part of the printer comprising this print medium transportation mechanism.

After passing the above-noted detectors, the leading edge of the check S reaches second transportation rollers 107. The second transportation rollers 107 have basically the same construction as the first transportation rollers 106, and the check S is grabbed between drive roller 107a and pressure roller 107b, and conveyed toward the exit position 104 by rotation of the drive roller 107a.

The check S enters the exit-side straight transportation path after finishing passing the U-shaped part, and is printed when it passes a juxtaposed position opposite the print head 114. If it is a check the back is printed. The print head is fixed in this embodiment and the check S is printed as it moves passed the print head.

An outside guide 102a is between the print head 114 and check S in this case, but there is an opening at this printing position 118 and there is no obstruction between the print head 114 and check S. A mechanism for retracting and protecting the print head 114 at a standby position when not printing could also be provided.

The check S printed by print head 114 is then discharged in the direction of arrow B by discharge rollers 108. These discharge rollers 108 also have basically the same construction as the first transportation rollers 106, and the check S is held between the drive roller 108a and pressure roller 108b, and is conveyed outside of the transportation path 102 by rotation of the drive roller 108a.

The check S processing sequence is described next.

As described above, by forming a U-shaped transportation path by which an inserted first scanned medium is returned after making a U-turn, the operator can easily insert the first scanned medium for a specific process executed along the transportation path, and then easily remove the check S while remaining seated.

Operation of each device along the second transportation path P2 is described in detail next following the flow of a card C.

A card C is inserted to the second transportation path P2 from the entrance 126 of the second transportation path P2. When detector 25 detects the card C, first reversing transportation roller 122 and second reversing transportation roller 123 start turning, and power is supplied to the image scanning sensors 111, 112. As with the first transportation path P1, power is supplied only when needed, resulting in a mechanism that prevents unnecessary power consumption.

When detector 124 detects the card C, an interlock engages so that the first transportation mechanism for transporting checks S does not operate.

The first and second reversing transportation rollers 122, 123 grab the card C with two rollers each and convey the card by roller rotation. Because the card C has a certain thickness and rigidity like a drivers license or credit card, an elastomer such as rubber is disposed to the outside surface of each roller so that the cards can be transported without slipping. As with the first transportation mechanism, the rollers could be urged by springs to dependably grip the card C with two rollers for transportation.

The card C is then grabbed by the first reversing transportation roller 122 and transported. Images are captured from both sides of the card C as it passes an opposing position juxtaposed to the image scanning sensor 111 and image scanning sensor 112. Transportation then stops when the leading edge of the card C is gripped by the second reversing transportation roller 123.

Various methods could be used to stop transportation, and this embodiment uses a method disposing a detector 125 for sensing the leading edge of the card C at a position on the discharge side of the second reversing transportation roller 123. Roller rotation is stopped when this detector 125 detects the leading edge of the card C.

Roller rotation is reversed after stopping, thus conveying the card C in the direction of entrance 126 for discharge from the second transportation path P2. This completes the card C processing sequence.

By having a straight second transportation path P2 and not just a U-shaped path, the present invention can also read data using the same device from a hard-to-bend scanned medium such as drivers licenses and credit cards.

Because multiple scanning devices typically cannot be installed in the limited space available in a bank teller window, for example, it has been necessary to go to a scanner located in a separate place to acquire data from a drivers license, for example, thus reducing job productivity. The data reading apparatus according to this embodiment of the invention, however, can solve this problem.

Figure 15:
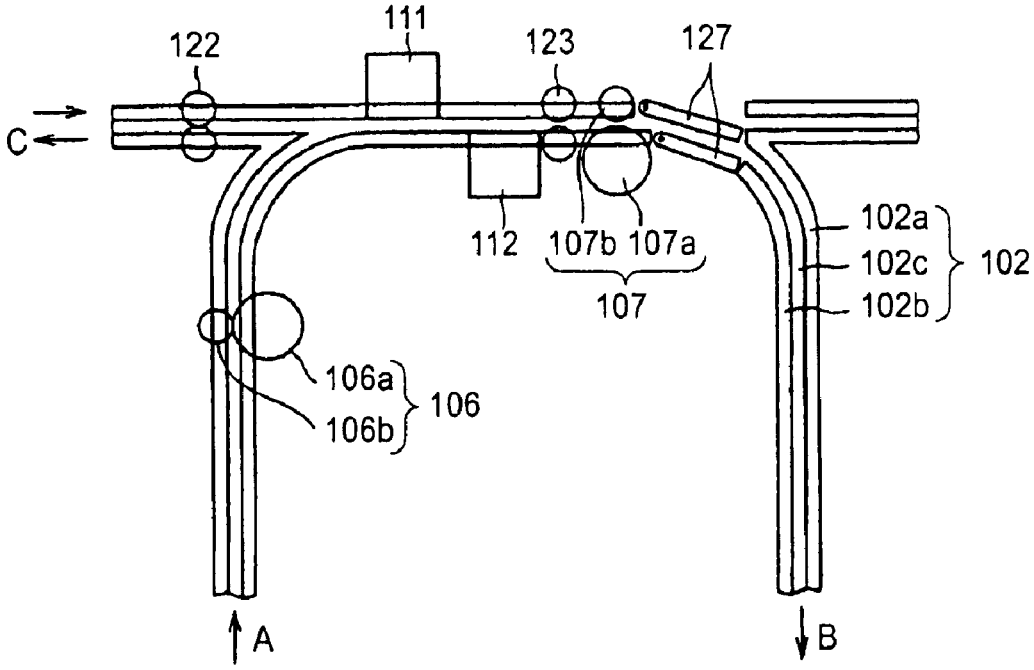
FIG. 15(a-b) show another embodiment according to the present invention of a data reading apparatus having a plurality of transportation paths.
Figure 15:
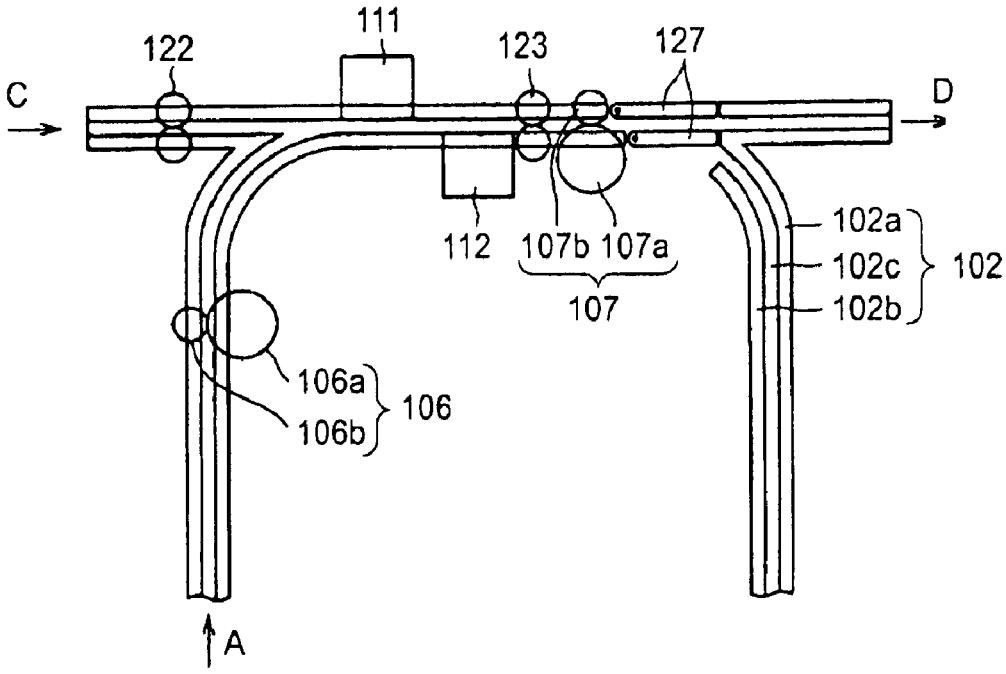

A data reading apparatus according to another embodiment of the invention is described next with reference to FIG. 15.

This embodiment has a straight connected transportation path disposed to both sides of the middle transportation path M. When a connected transportation path is also disposed to the exit side of the middle transportation path M, a switching mechanism for selecting the transportation path must be provided.

When it is not necessary to discharge the check S to more than one exit, the connected transportation path should only be provided on the inlet side to the middle transportation path. When a data read error occurs or it is necessary to select and identify different discharge paths when data is read normally, the layout described in this embodiment can be effectively used to select the discharge path.

A switching mechanism 127 is disposed on the exit side of the middle transportation path M in this embodiment of the invention. In FIG. 15(a) the transportation path (the connected transportation path communicating with the exit side of the middle transportation path M) is closed to the side advancing in a straight line, and is open to the side in which the path curves 90 degrees. As described above, therefore, a check S inserted from the direction of arrow A to the first transportation path P1 is conveyed through the U-shaped transportation path by the first transportation mechanism, is scanned by the image scanning sensors 111, 112 and printed, and then discharged in the direction of arrow B.

When a card C is inserted from the direction of arrow C, it is conveyed by the second transportation mechanism, and scanned by the image scanning sensors 111, 112, the transportation direction is then reversed, and the card can be ejected in the direction of arrow C. However, with the configuration shown in FIG. 15(b), the card C can be advanced and ejected without reversing the transportation mechanism.

In the case shown in FIG. 15(b), the transportation path is open on the straight transportation path side and is closed to the side curving 90 degrees. Therefore, after a check S is inserted from the direction of arrow A to the first transportation path P1, it is conveyed by the first transportation mechanism, scanned by the image scanning sensors 111, 112, and then further conveyed in a straight path and ejected in the direction of arrow D.

This embodiment could be used as follows when processing a check. If there is no problem with scanning by the image scanning sensor, for example, the first scanned medium is transported in a U-shaped path as shown in FIG. 15(a), the back is printed by the print head, and the check is then ejected in the direction of arrow B. If the image scanning sensor generates a scanning error, for example, the check S is conveyed to the straight transportation path as shown in FIG. 15(b), and is ejected in the direction of arrow D without printing the back.

A second scanned medium is processed in FIG. 15(b) by being inserted from the direction of arrow C, transported in one direction, and then ejected in the direction of arrow D. Images of the card are captured by the image scanning sensors 111, 112 as it travels passed. A mechanism for reversing transportation is not needed in this configuration.

The layout could also be configured so that the connected transportation path of second transportation path P2 is connected only to the exit side of the middle transportation path. A switching mechanism 127 is needed in this case, and it is also necessary to drive the transportation rollers for the second scanned medium in forward and reverse. The discharge path for the first scanned medium can, however, be selected as described above.

Preferred embodiments of a data reading apparatus according to the present invention are described above, but the invention shall not be limited to these embodiments and can be modified in many ways.

DESIGNATIONS OF REFERENCE NOS.

1 data reading apparatus
2a outside guide
2b inside guide
2c transportation part
3 paper supply part
4 exit
6 first transportation rollers
7 second transportation rollers
8 discharge rollers
9 BOF detector
10 TOF detector
11 first image scanning sensor
11a upper pressure member
11b lower pressure member
12 second image scanning sensor
12a upper pressure member
12b lower pressure member
13 MICR
14 print head
16 pressure rollers
16a upper pressure roller
16b lower pressure roller
18 printing area
20 card insertion opening
21 connecting transportation path
21a outside guide
21b inside guide
21c transportation part
22 reversing transportation roller
23 second connecting transportation path
24 bottom guide
25 BOC detector
26 TOC detector
30 MICR pressure device

What is claimed is:

1. A data reading apparatus for reading *data from* and/or scanning [data from] a first and second [scanned] medium, the first medium being bendable and the second medium being substantially rigid, the reading apparatus comprising:

a first transportation path having an inlet end and an exit end;

a second transportation path having an inlet end separate from the inlet end of the first transportation *path*; and a data reader for reading *data from* and/or scanning [data from] either the first or the second [scanned] medium, [respectively.]

wherein the first transportation path and the second transportation path have a common mutually shared middle transportation path through which both the first [scanned] medium and the second [scanned] medium pass when being transported with the data reader being disposed along said middle transportation path.

2. A data reading apparatus as described in claim 1, wherein the first [and second] transportation path comprises:

[the first transportation path has] a first straight [transportation path] *section*;

a first curved [transportation path] *section* connected between the first straight [transportation path] *section* and [a] *the* middle transportation path, a second curved [transportation path] *section* connected to the middle transportation path, and a second straight [transportation path] *section* connected to the second curved [transportation path] *section,* wherein the second transportation path has a third straight [transportation path] *section* including the middle transportation path.

3. A data reading apparatus as described in claim 1, wherein the inlet end of the second transportation path is adapted:

for inserting the second [scanned] medium into the middle transportation path[;], and *the second transportation path* further comprising a reversing transportation path connected to the middle transportation path for reversing the direction of transportation of the second [scanned] medium such that [the] *an* inlet end [thereof] *of the reversing transportation path* also serves as [the] *a* discharge end [for] *thereof with respect to* the second [scanned] medium [from].

4. A data reading apparatus as described in claim 1, wherein the first transportation path and the second transportation path each have a reference bottom with the reference bottom of the second transportation path being disposed at a height different from the height of the first transportation path reference bottom such that the transportation [height] *heights* of the first and second [scanned] medium [is] *are* different when read by said data reader.

5. A data reading apparatus as described in claim 4, further comprising a guide for guiding the change in transportation direction of the first [scanned] medium along the second curved [transportation path] *section*, with said guide being disposed at a height spaced from the reference bottom of the second transportation path.

6. A data reading apparatus as described in claim 4, comprising*:* a first pressure member disposed above the reference bottom of the second transportation path for pressing the first or the second [scanned] medium to the data reader; and

*a* second pressure member disposed below the reference bottom of the second transportation path for pressing the first [scanned] medium to the data reader.

7. A data reading apparatus as described in claim 6, wherein the [lower] *second* pressure member is a dropping prevention member preventing the second [scanned] medium from dropping below the reference bottom of the second transportation path.

8. A data reading apparatus as described in claim 4, comprising*:* a first pressure roller disposed above the reference bottom of the second transportation path for transporting the first or the second [scanned] medium; and

*a* second pressure roller disposed below the reference bottom of the second transportation path for transporting the first [scanned] medium.

9. A data reading apparatus as described in claim 1, comprising a print head disposed along the first transportation path for printing to the first [scanned] medium.

10. A data reading apparatus as described in claim 1, wherein the data reader is an image scanning sensor for capturing an image of the first or the second [scanned] medium.

11. A data reading apparatus as described in claim 1, wherein the data reader is *a* magnetic sensor for reading magnetic data on the first or the second [scanned] medium.

12. A data reading apparatus as described in claim 1, wherein the first [scanned] medium is a check and the second [scanned] medium is a card.

13. A data reading apparatus as described in claim 1, comprising a medium detector disposed along the second transportation path for detecting the leading edge and trailing edge of the second [scanned] medium [respectively];

wherein transportation of the second [scanned] medium is controlled according to a detection signal from the medium detector.

14. A data reading apparatus for reading *data from* and/or scanning [data from] a first and second [scanned] medium, the first medium being bendable and the second medium being substantially rigid, the reading apparatus comprising:

a first transportation path having an inlet end and an exit end;

a second transportation path having an exit end separate from the exit end of the first transportation path; and a data reader for reading *data from* and/or scanning [data from] either the first or the second [scanned] medium, [respectively,]

wherein the first transportation path and the second transportation path have a common mutually shared middle transportation path through which both the first [scanned] medium and the second [scanned] medium pass when being transported with the data reader being disposed along said middle transportation path.

15. A data reading apparatus for reading *data from* and/or scanning [data from] a first and second [scanned] medium, comprising:

a first transportation path having a curved section, an inlet end and an exit end;

a second transportation path having a straight section and an inlet end separate from the inlet end of the first transportation path; and a data reader for reading *data from* and/or scanning [data from] either the first or the second [scanned] medium, [respectively,]

wherein the first transportation path and the second transportation path have a common mutually shared middle transportation path through which both the first [scanned] medium and the second [scanned] medium pass when being transported with the data reader being disposed along said middle transportation path.

* * * * *